US007680912B1

(12) United States Patent
McNabb et al.

(10) Patent No.: US 7,680,912 B1
(45) Date of Patent: Mar. 16, 2010

(54) SYSTEM AND METHOD FOR MANAGING AND PROVISIONING STREAMED DATA

(75) Inventors: James McNabb, Reston, VA (US); Ben Battle, Chantilly, VA (US)

(73) Assignee: thePlatform, Inc., Philadelphia, PA (US)

( * ) Notice: Subject to any disclaimer, the term of this patent is extended or adjusted under 35 U.S.C. 154(b) by 1239 days.

(21) Appl. No.: 09/915,287

(22) Filed: Jul. 27, 2001

(51) Int. Cl.
G06F 15/173 (2006.01)
G06F 15/16 (2006.01)
(52) U.S. Cl. ...................... 709/223; 709/231
(58) Field of Classification Search ............... 709/231, 709/218, 238, 203, 223, 232, 239, 204; 370/386, 370/449; 705/400, 26; 726/3–5, 27, 29
See application file for complete search history.

(56) References Cited

U.S. PATENT DOCUMENTS

| 5,778,187 | A | * | 7/1998 | Monteiro et al. ............. 709/231 |
| 5,841,980 | A | * | 11/1998 | Waters et al. ................ 709/204 |
| 5,918,013 | A | | 6/1999 | Mighdoll et al. ........ 395/200.47 |
| 6,151,632 | A | * | 11/2000 | Chaddha et al. ............. 709/231 |
| 6,182,143 | B1 | * | 1/2001 | Hastings et al. ............. 709/231 |
| 6,308,208 | B1 | * | 10/2001 | Jung et al. ................... 709/224 |
| 6,336,138 | B1 | * | 1/2002 | Caswell et al. .............. 709/223 |
| 6,370,571 | B1 | * | 4/2002 | Medin, Jr. ................... 709/218 |
| 6,396,845 | B1 | * | 5/2002 | Sugita ........................ 370/449 |
| 6,407,680 | B1 | | 6/2002 | Lai et al. ...................... 341/50 |
| 6,480,961 | B2 | * | 11/2002 | Rajasekharan et al. ........ 726/27 |
| 6,505,254 | B1 | * | 1/2003 | Johnson et al. .............. 709/239 |
| 6,517,587 | B2 | * | 2/2003 | Satyavolu et al. .......... 715/501.1 |
| 6,570,974 | B1 | * | 5/2003 | Gerszberg et al. ....... 379/218.01 |
| 6,714,921 | B2 | * | 3/2004 | Stefik et al. ................... 705/55 |
| 6,721,741 | B1 | | 4/2004 | Eyal et al. ...................... 707/10 |
| 6,751,673 | B2 | * | 6/2004 | Shaw ........................... 709/231 |
| 6,754,699 | B2 | * | 6/2004 | Swildens et al. ............. 709/217 |

(Continued)

FOREIGN PATENT DOCUMENTS

EP 0 575 279 A2 12/1993
WO WO 02/19701 A1 3/2002

OTHER PUBLICATIONS

Clark et al, A System and Method For Large Scale, Distributed, Personalized Media On Demand, Mar. 29, 2001, WIPO, WO 01/22725.*

(Continued)

Primary Examiner—Aaron Strange
(74) Attorney, Agent, or Firm—Banner & Witcoff, Ltd.

(57) ABSTRACT

A system and method for managing and provisioning streamed data by controlling, measuring and monitoring access to multicasted and/or unicasted data over a network includes a director, a hierarchy of participant managers, and a turnstile installed at each participant to which the data is to be delivered. Content providers provide information associated with an event (i.e., data) to the director. The director oversees the delivery of the event to a participant. In particular, the director provisions network resources and provides a ticket to the event to the participant. The participant acquires the ticket, either directly or indirectly from the director. When the participant attempts to access the event, the locally installed turnstile authenticates the ticket thereby gating access to the event. The turnstile also provides delivery statistics associated with the delivery of the event to the director via the hierarchy of participant managers.

17 Claims, 17 Drawing Sheets

U.S. PATENT DOCUMENTS

| | | | |
|---|---|---|---|
| 6,807,580 B2 * | 10/2004 | Freeman et al. | 709/249 |
| 6,928,463 B1 * | 8/2005 | Tene et al. | 709/203 |
| 7,080,153 B2 * | 7/2006 | Monteiro et al. | 709/231 |
| 7,089,309 B2 | 8/2006 | Ramaley et al. | 709/226 |
| 7,263,497 B1 | 8/2007 | Wiser et al. | 705/26 |
| 7,308,462 B1 | 12/2007 | Clarkson et al. | 707/104.1 |
| 2001/0009014 A1 * | 7/2001 | Savage et al. | 709/204 |
| 2002/0049912 A1 * | 4/2002 | Honjo et al. | 713/201 |
| 2002/0091760 A1 * | 7/2002 | Rozen | 709/203 |

OTHER PUBLICATIONS

Jennifer Mears, "Akamai, Reliacast partner to manage streaming content", Jul. 30, 2001, Network World, Available at: http://www.networkworld.com/archive/2001/123362_07-30-2001.html.*

Philip De Lancie, "Getting to Know You: Reliacast Puts the Audience into Content Mangement", Nov. 1, 2001, Econtentmag.com, Available at: http://www.ecmag.net/Articles/ArticlePrint.aspx?ArticleID=1040&IssueId=110.*

* cited by examiner

Fig. 16                    1600

SYSTEM AND METHOD FOR MANAGING AND PROVISIONING STREAMED DATA

BACKGROUND

1. Field of the Invention

The present invention relates generally to network communications systems and more particularly to managing and provisioning streamed data over a network where recipients of that data can be authorized, authenticated, and billed for receiving that data.

2. Discussion of the Related Art

Today's user of a network communication system is demanding that large amounts of content (i.e. data, voice, images, video, etc.) be delivered to their network receiving device (e.g., computer, set-top, PDA, cellular phone, etc.) in real-time. As network communications systems, particularly the Internet, become a ubiquitous communication link among users worldwide, more applications are looking to this link to deliver content to multiple users simultaneously in the form of a network broadcast. In the network broadcast, multiple users receive similar or identical content from a single source virtually simultaneously.

One conventional mechanism for delivering content over a network communication system is referred to as a unicast. In unicasting, a source of the content sends the content to each of the users or "recipients" of the content within the network communication system. This is referred to as a "one to one" delivery of content. Unicasting to N recipients involves sending N copies of the content over the network communication system, one copy to each recipient. For large numbers of recipients, these multiple copies have a deleterious effect on the performance of the network communication system, particularly for content requiring a high amount of bandwidth for delivery (e.g., video streams).

Another mechanism for delivering content over the network communication system is to simply broadcast the content to every user on the network communication system regardless of whether the user desires to receive the content or not. This is referred to as a "one to all" delivery of content. With broadcasting, one copy of the content, addressed to every user on the network, is transmitted over the network communication system. While broadcasting reduces the amount of the network bandwidth consumed by the delivery of the content, not all users desire or should receive the content. Furthermore, the source of the content has no mechanism for determining which of the recipients received the content.

Another mechanism for delivering content over the network communication system is a referred to as a multicast. In multicasting, the source of the content sends one copy of the content addressed to only those recipients who should receive the content. This is referred to as a "one to many" delivery of content. With this form of delivery, the content is replicated at key points in the network communication system so that each recipient receives the content quickly and efficiently without the problems associated with other forms of delivery.

However, conventional delivery of content via multicast still has many problems that heretofore have hindered its adoption as a content delivery standard. One problem associated with multicasting not found with unicasting is that the originator of the content does not know which, if any, of the recipients actually received the content. In contrast, with unicasts, the originator can measure network bandwidth and determine the recipients of the content. However, with unicasts, the number of recipients is bound by the resources available to support the replication of each content stream.

Another problem with multicasting is that the originator of the multicast content is unable to measure the amount and quality of the content delivered to any particular recipient. Originators that bill recipients based on bandwidth usage are reluctant to provide a service for which they cannot effectively measure that usage. Furthermore, in network communication systems employing unicasts, there is a direct relationship between the number of servers in the system and the number of recipients able to be serviced by the system. Thus, billing for those services is relatively straightforward. This same relationship is not available in a network communication system employing multicasts.

What is needed is an improved system and method for managing and provisioning streamed data in a network communication system.

SUMMARY OF THE INVENTION

The present invention is directed toward a system and method for managing and provisioning streamed data in a network communication system. In particular, the present invention provides a system and method for managing, measuring, and controlling the delivery of multicasted, unicasted and/or on demand information across a network communication system. The present invention is described in terms of a stadium analogy where participants receive an "event," or the information, from a "stadium." Prior to entering the stadium, participants present a "ticket" at a "turnstile." The turnstile prevents those participants without a proper ticket from entering the event. The turnstile also provides information via a hierarchy of participant managers to the "director" of the event regarding when the participant entered the event, when the participant exited the event, and/or information regarding the delivery of the event to the participant. The hierarchy of participant managers aggregates this information thereby providing an indication of the stadium's "use" to the director. This aggregated information may be provided to an event sponsor (i.e., a content provider) for purposes of billing, advertising, and/or determining levels of participation in the event and among events.

One feature of the present invention is that the hierarchy of participant managers is self-organizing and self-healing. Each of the participant managers automatically locates its position in the hierarchy based on a predetermined level. The participant manager multicasts its level to other participant managers, some of which respond and identify their own level. Based on the responses, the participant manager determines to which of the other participant managers it should be attached. If, at any point, one of the participant managers fails, participant managers attached beneath the failing participant manager are able to relocate themselves within the hierarchy to prevent "blackouts" among particular participants.

Another feature of the present invention is that the participant managers preferably organize themselves on a geographical basis with the lowest level participant managers attached to participants in close physical proximity thereto. Higher level participant managers are similarly attached to the lower level participant managers. In this manner, each subsequently higher level of participant manager represents a greater number of participants in a larger geographic area until the highest level of participant manager represents all the participants of the event. This feature allows the director and/or the content providers to determine the geographic areas of the participants participating in a particular event. This feature enables the director to properly allocate resources among the geographic areas for future events. This also provides opportunities for targeting advertisements to the participants on a geographic basis.

Still another feature of the present invention collects demographic information associated with the participant in exchange for the ticket. Preferably, this demographic information is incorporated into the ticket so that during the event, the director and/or the content provider can identify and classify any of the participants or groups of participants receiving in the event. The demographic information also provides opportunities for targeting advertisements to the participants on a demographic basis.

Yet still another feature of the present invention presents statistics associated with the delivery of the event to participants in a tree structure in a graphic user interface. The tree structure includes the director at the root, various levels of participant managers forming the branches, and participants at the leaves. Each level of participant managers corresponds to a level indicator in the tree structure. Each level indicator identifies the participant manager and provides information about the participant managers or participant connected beneath it in the tree structure. This information represents aggregate delivery statistics pertaining to all of the participants connected beneath it in the tree structure. A user is able to navigate the tree structure and "drill down" to particular levels to access these aggregate delivery statistics associated with a particular participant manager or the delivery statistics and/or demographic information pertaining to an individual participant.

These and other features and advantages of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is directed toward a system and method for multicasting data in a network communication system. In particular, the present invention provides a system and method for managing, measuring, and controlling how multicasted and/or unicasted information is delivered across a network communication system (i.e., "stadium environment"). While the present invention is described herein using a "stadium analogy," it will be apparent from the following discussion how the present invention contemplates delivery of any form of data to multiple recipients in a stadium environment in an authenticated, reliable and controlled manner.

System Overview

Figure 1:
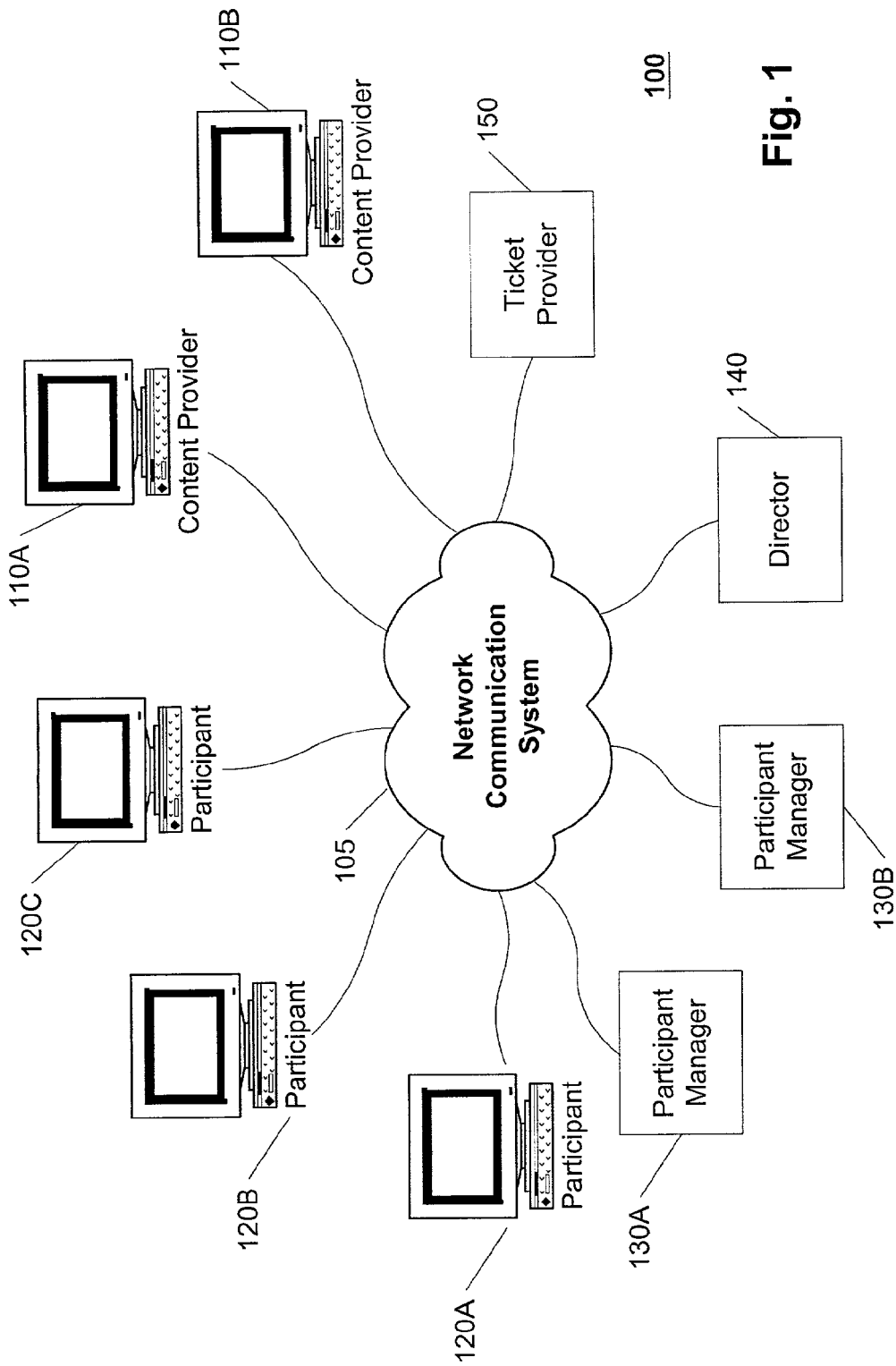
FIG. 1 illustrates a stadium environment according to the present invention.

FIG. 1 illustrates a stadium environment 100 according to the present invention, includes a multicast-enabled network communication system 105. Stadium environment 100 may include at least one content provider 110 (illustrated as a content provider 110A and a content provider 110B), a plurality of participants 120 (illustrated as a participant 120A, a participant 120B, and a participant 120C), one or more participant managers 130 (illustrated as a participant manager 130A and a participant manager 130B), a director 140 and/or a ticket provider 150.

Figure 2:
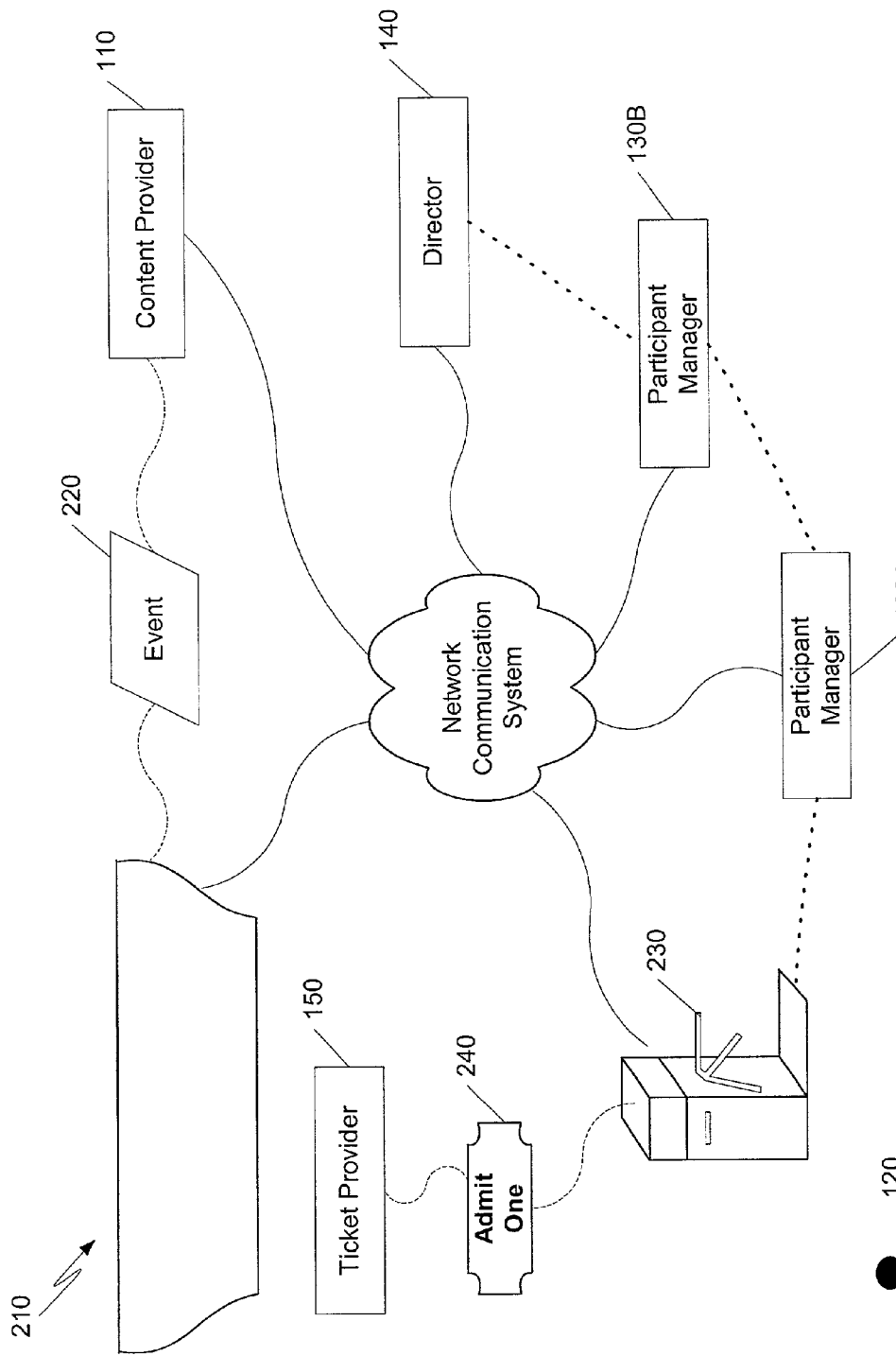
FIG. 2 illustrates a stadium analogy useful for describing the present invention.

FIG. 2 illustrates a stadium analogy 200 useful for describing stadium environment 100, particularly for describing its use to deliver an event 220. Content providers 110 provide event 220 to stadium 210 for delivery to participants 120. Participants 120 acquire a ticket 240 to event 220 from ticket provider 150. Participants 120 present ticket 240 at a turnstile 230 to enter stadium 210 whereby they begin participating in event 220.

Participant managers 130 located at strategic points within network communication system 105 manage the delivery of event 220 to the participants 120. Director 140 oversees the delivery of event 220 by provisioning stadium access capacity of participant managers 130, supervising participant managers 130, ensuring that event 220 is delivered to each participant 120.

Using turnstiles 230, participant managers 130 can determine which and how many of participants 120 participated in event 220 and can determine the duration of that participation. This information is collected and aggregated by participant managers 130 and maintained by director 140 for billing purposes or for evaluating demographic information associated with participants 120 of event 220. Each of these aspects of stadium environment 100 is described in further detail below.

Stadium Environment

Stadium environment 100 includes network communication system 105 that is configured for multicasting and/or unicasting content (i.e. events 220) from a single source (i.e., stadium 210) or multiple sources to multiple recipients (i.e., participants 120). In one embodiment of the present invention, stadium environment 100 operates on the Internet using well-established protocols, including various protocols for communicating via one or more wireless connections. In an alternate embodiment of the present invention, stadium environment 100 operates on an entity's intranet using similar well-established network protocols. This entity may include, but is not limited to a company, a government, a government agency, an organization or any other entity that operates a private intranet or similar communication network.

Event

According to the present invention, event 220 is the delivery of an information stream or "content" to multiple recipients in a time-sensitive "live" or on-demand manner. Preferably, in the case of a live event, event 220 is intended to arrive virtually simultaneously at each participant 120. When event 220 is an on-demand event, event 220 arrives at participant 120 when requested. Event 220 may comprise continuous content such as a video stream, an audio stream, or other form of continuous data stream that is either "live" or pre-recorded. Event 220 may also be a combination of shows or events that run continuously as a channel. The content may also comprise one or more data files such as an image file, an application program, key license file, an application program update, a database, or other form of data file destined to multiple recipients. The content may also comprise a conferencing information stream such as video teleconferencing, audio teleconferencing, collaborative working environments or other form of conferencing information stream; a news information stream such as various wire service information streams including UPI, API, etc.; equity and/or commodity ticker information streams such as NYSE, NASDAQ, CBOE, etc.; and a gaming information stream for interactive multi-player network games. The content may originate from one or multiple sources. The participant manager 130 distributes the URL address of the content source(s) or content URL ("CURL") through the stadium environment 100 to the participant manager 130 and to the participants 120 of the event after authentication.

Content Providers

Content providers 110 provide the content that is to be delivered to participants 120 in stadium environment 100, preferably from stadium 210 in the form of event 220. More particularly, content providers 110 provide an information stream that is to be multicasted or unicasted to participants 120. In general, content providers 110 may provide any form of information stream that may benefit from delivery in a stadium environment 110, particularly where identical or similar information is to be delivered to multiple participants 120, either simultaneously (or virtually simultaneously) or upon request.

Content providers 110 may include commercial webcasting companies, television and radio networks, sports teams, as well as enterprises. Examples of commercial company information streams include, but are not limited to, financial and technical community briefings and conferences, sporting events, music concerts, movie premieres, news services and on-line learning. Examples of enterprise information streams include, but are not limited to, all-hands briefings and announcements, management communications, employee training, and customer service communications.

According to a preferred embodiment of the present invention, content providers 110 establish a web page for the information stream that can be accessed via a web browser or similar tool depending upon the platform (e.g. television, set-top box). Preferably, from the perspective of participants 120, the information stream is accessed as event 220 through stadium 210. Content provider 110 provides director 140 with an address (preferably a URL address) for the web page associated with event 220 discussed above to accomplish this aspect of the invention. Director 140 reformats this URL address as a Stadium URL address ("SURL") for operation within stadium environment 100 and returns the SURL to content provider 110 to be included in the web page. Further aspects of the interaction between content provider 110 and stadium environment 100 are discussed in further detail below.

Stadium

Figure 7:
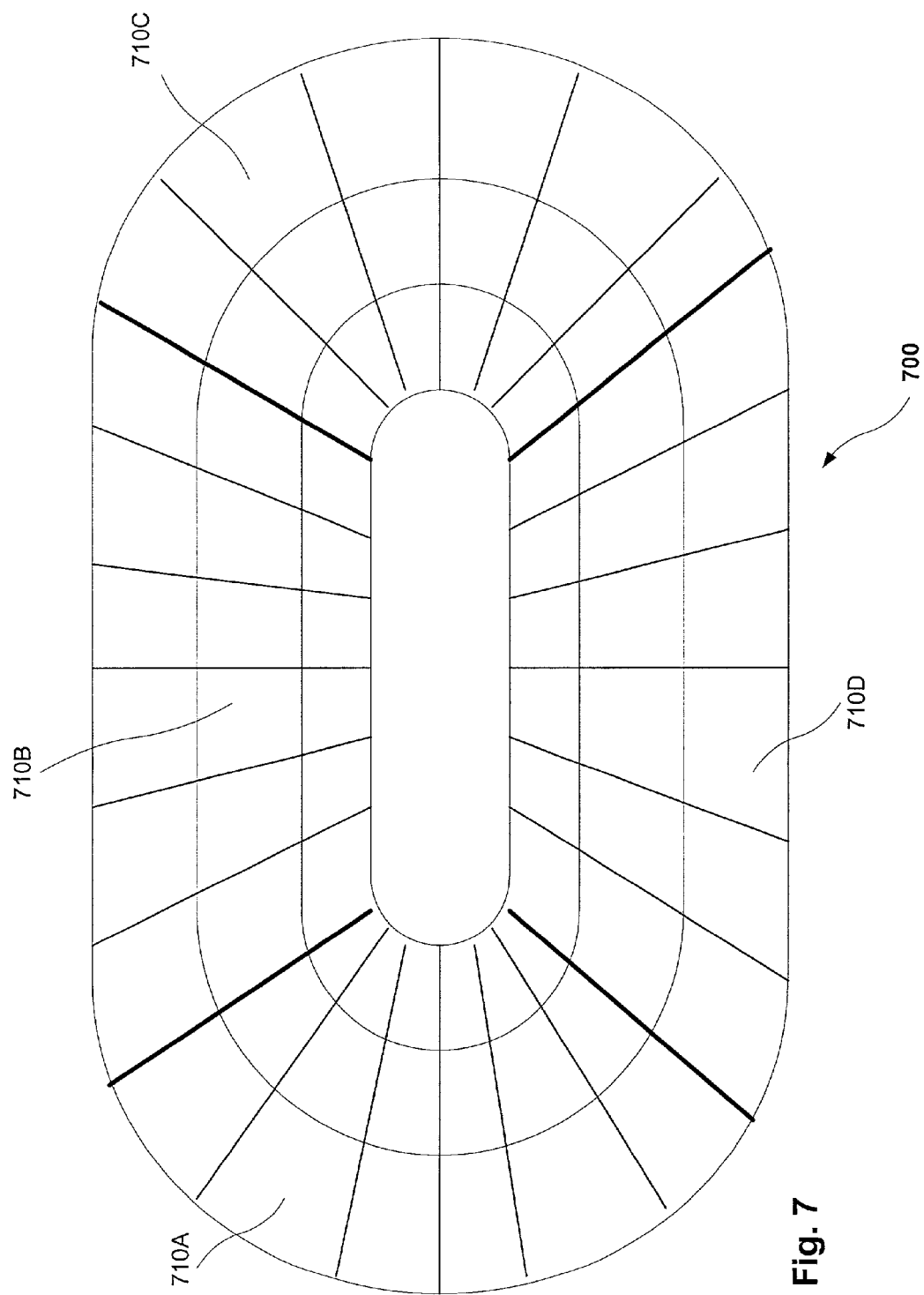
FIG. 7 illustrates a stadium according to one embodiment of the present invention.

FIG. 7 illustrates stadium 210 according to one embodiment of the present invention. According to the present invention, stadium 210 is a virtual stadium. Stadium 210 may include one or more sections 710 (illustrated as a first section 710A, a second section 710B, a third section 710C, and a fourth section 710D). In one embodiment of the present invention, each section 710 is associated with a different event 220 being offered in stadium 210 at that particular time. In an alternate embodiment of the present invention, each section 710 is associated with a different class of service associated with the delivery of a particular event 220. Such classes of service may include, for example, encoding data at different bit rates for delivery via a cable modem so that a lower class of service might receive data at 56 kbps and a higher class of service might receive data at 300 kbps. Other forms of discriminating classes of service are available as would be apparent.

Events 220 offered in stadium 210 offered at any particular time may all originate from a particular content provider 110. Alternately, events 220 offered in stadium 210 may originate from different content providers 110.

The present invention also contemplates multiple stadiums 210 each offering multiple events 220 or multiple classes of service for a particular event 220 at any particular time. For example, one stadium 210 may offer various live baseball games, while another stadium 210 may offer various inspirational speakers. Events offered via various stadiums 210 and within particular stadiums are numerous and may be organized in various manners as would be apparent.

Participants

Participants 120 are those users that receive event 220 (i.e., recipients of the information stream) via network communication system 105. Participants 120 may be consumers in the event that content provider 110 is a commercial company, or employees in the event that content provider 110 is an enterprise.

Preferably, participants 120 perceive that they receive event 220 from stadium 210. In a preferred embodiment of the present invention, participants 120, upon accessing stadium 210 to participate in event 220, are redirected to content provider 110, or more particularly, to a multicast-enabled URL address from which event 220 is delivered. In some embodiments of the present invention, content providers 110 provide event 220 to stadium 210 a priori, and stadium 210 subsequently directs participants 120 to the multicast enabled URL address.

Participants 120 generally receive the information stream via a suitable receiving device such as, but not limited to, a computer workstation, a PDA, a memory device (e.g., an MP3 player, a memory stick, etc.), a cellular telephone, a set-top box, or any other form of electronic device capable of receiving information from network communication system 105, including those employing one or more wireless connections to network communication system 105. In one embodiment of the present invention, the receiving device includes a web browser that operates in conjunction with an event renderer such as a media player (e.g., Real Player™, Microsoft Windows' Media Player™, etc.) to render event 220 for use by participant 120. In an alternate embodiment, the event renderer is delivered prior to or as part of event 220. For example, if event 220 comprises an application program upgrade, event 220 may also include or be accompanied by a self-installing event renderer that installs the upgrade on participants' receiving device. The interaction between participants 120 and stadium environment 100 is discussed in further detail below.

Participant Managers

Figure 3:
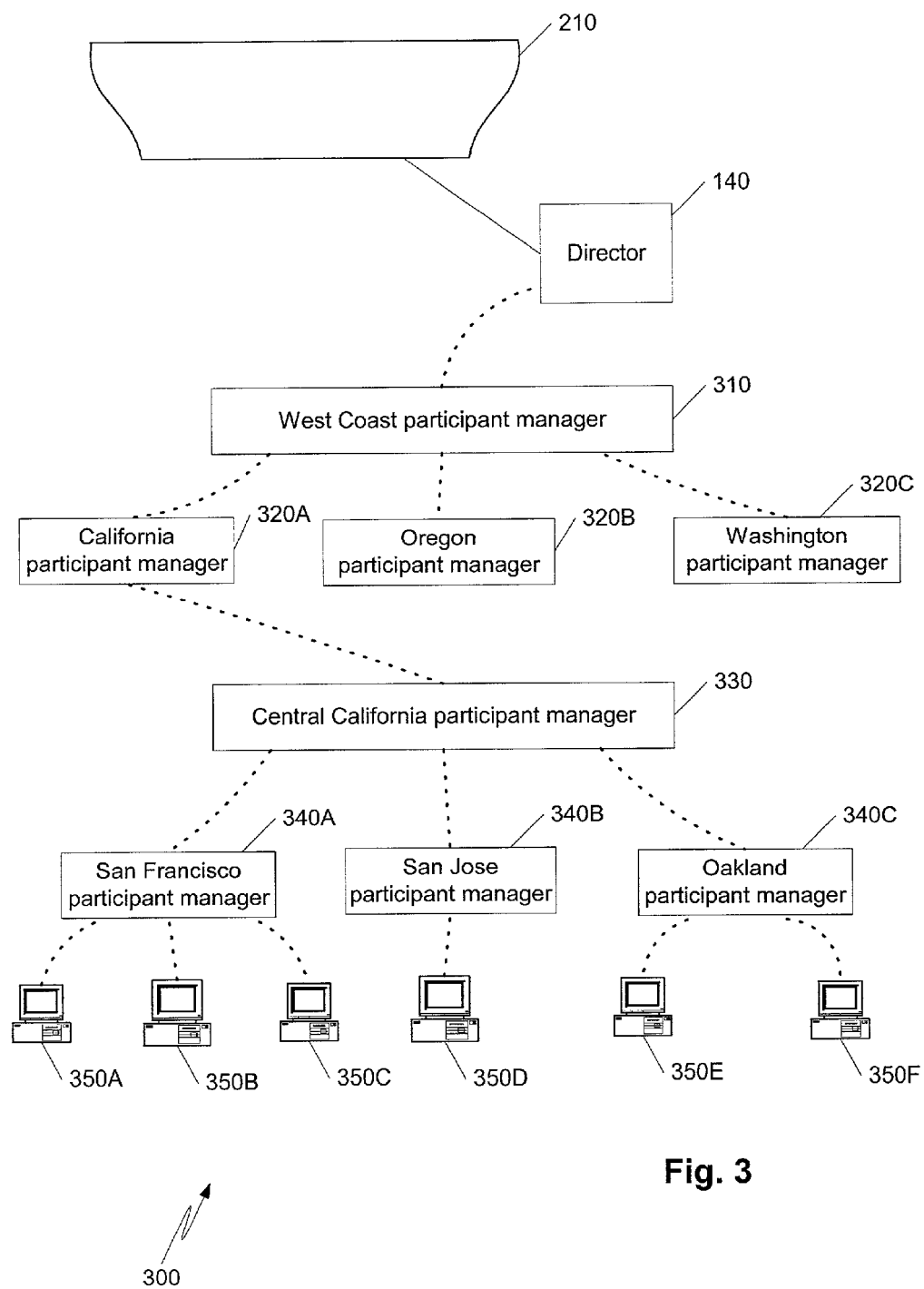
FIG. 3 illustrates an exemplary hierarchy of participant managers.

Participants 120 are managed and organized in stadium environment 100 by one or more participant managers 130 located at various strategic points within the network communication system. Preferably, participant managers 130 are organized within stadium environment 100 in a hierarchy 300 as illustrated in FIG. 3. Hierarchy 300 includes one or more levels of participant managers 130. Each level may organize and manage one or more lower levels of participant managers 130 and/or one or more participants 120. Preferably, stadium environment 100 includes up to 255 levels of participant managers 130 with any number of participant managers 130 resident at each level. Other embodiments include fewer or more levels of participant managers 130 as would be apparent. Hierarchy 300 forms a tree topology with participants 120 at the "leaves," various levels of participant managers 130 forming the "branches" and director 140 forming the "root."

Hierarchy 300 of participant managers 130 manage and organize participants 120 in stadium environment 100 by directing network commands and control information downward from director 140, through the levels of participant managers 130, and ultimately to participants 120. Likewise, information associated with the delivery of the event is directed upward from participants 120, through the levels of participant managers 130, which aggregate the information, to director 140 which monitors the delivery of the event. This process is discussed in further detail below.

In one embodiment of the present invention, hierarchy 300 is formed on a geographic basis. As illustrated in FIG. 3, hierarchy 300 includes a regional (e.g., West Coast) participant manager 310 that manages and organizes three state participant managers 320 within that region, namely a California participant manager 320A, an Oregon participant manager 320B, and a Washington participant manager 320C. Each of these state participant managers 320 may include one or more district participant managers 330. As illustrated in FIG. 3, California participant manager 320 includes at least a Central California participant manager 330. Other district participant managers 330 may be included but are not illustrated for purposes of clarity.

Each district participant manager 330 may further include one or more locality participant managers 340. As illustrated in FIG. 3, Central California participant manager 330 includes a San Francisco participant manager 340A, a San Jose participant manager 340B, and an Oakland participant manager 340C. Various additional lower levels of granularity may be included in hierarchy 300. However, in this illustration, each locality participant manager includes one or more participants 120. As illustrated in FIG. 3, San Francisco participant manager 340A includes a participant 350A, a participant 350B, and a participant 350C; San Jose participant manager 340B includes a participant 350D; and Oakland participant manager 340C includes a participant 350E and a participant 350F.

It should be understood that the terms "regional," "state," "district," and "locality" are used herein for purposes of illustration and not as specifying any particular method of organizing participants 120. As would be apparent, various mechanisms for organizing participants 120 and participant managers 130 into hierarchy 300 are available and might be used in various circumstances.

Preferably, participant managers 130 are located at various strategic points within the network communication system 105 and are associated with network entities that serve as the gateway for network access by participants for a geographic region. When network communication system 105 includes the Internet, these strategic locations may include various points-of-presence ("POPs") within the Internet, preferably located near participants 120. Alternately, when network communication system 105 includes an Intranet, these strategic locations may include various subnets, departments, buildings, or geographic locations within the intranet. Of course these locations may also include a combination of strategic points within various intranets operating within the overall framework of the Internet as would be apparent.

Director

Figure 4:
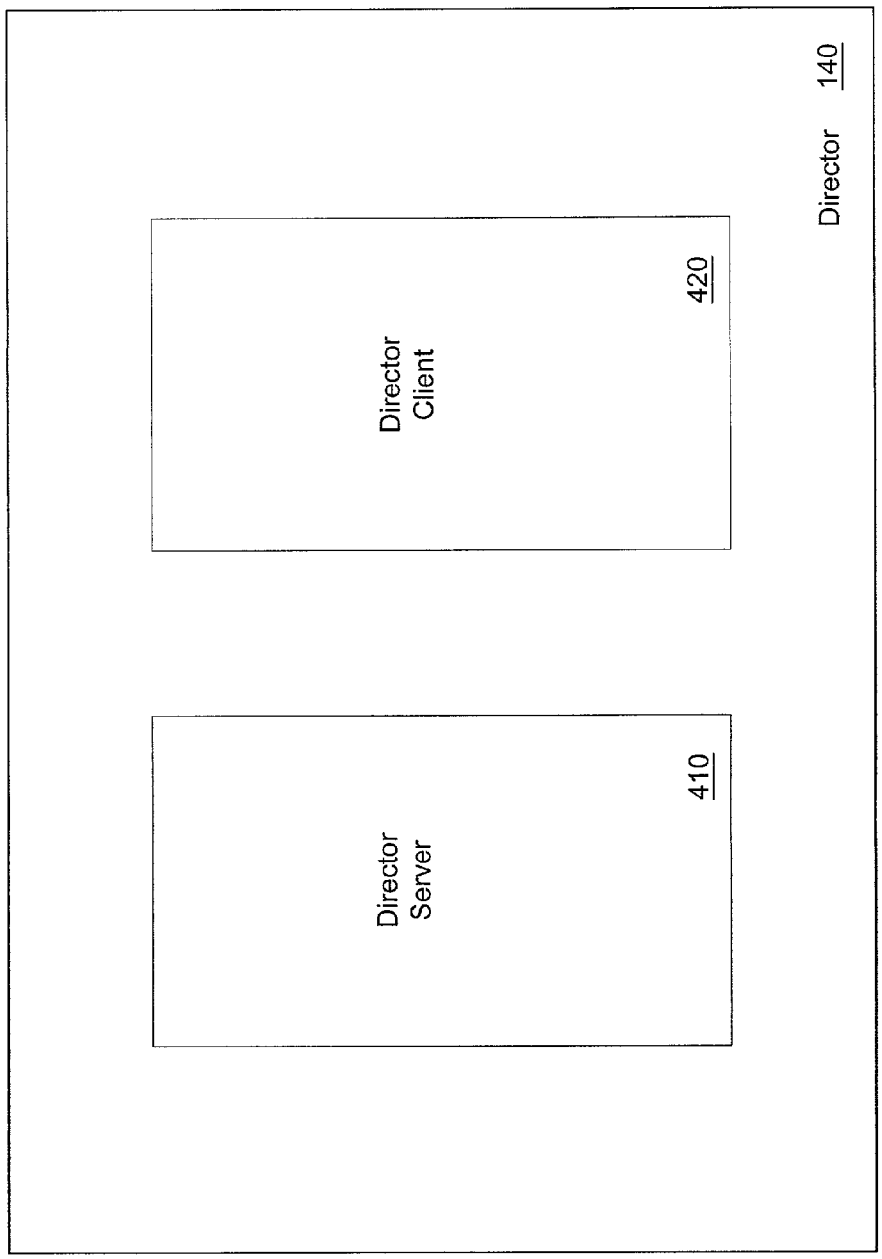
FIG. 4 illustrates a director according to a preferred embodiment of the present invention.

Preferably, each stadium 210 in stadium environment 100 is associated with a director 140. However, in alternate embodiments of the present invention, director 140 may be associated with several stadiums 210. Director 140 oversees and manages the delivery of event 220 from stadium 210 to participants 120. Director 140 also provisions tickets 240 for events 220 in stadium 210. In a preferred embodiment of the present invention, director 140 is comprised of two components: a director server 410 and a director client 420 as illustrated in FIG. 4. Each of these is now described in further detail.

Director Client

According to a preferred embodiment of the present invention, director client 420 is one component of director 140. Director client 420 preferably comprises a web-based monitoring tool that provides dynamic, real-time management views of the delivery of event 220 within stadium environment 100. In particular, director client 420 provides information regarding participants 120 as well as delivery statistics associated with participants 120 at various levels within hierarchy 300. Director client 420 also provides interactive control over participant managers 130 and participants 120 within hierarchy 300, including the ability to delete a particular participant 120 from event 220.

Director client 420 also operates as an interface to create event 220, edit event 220, remove event 220, provision access capacity for event 220 and other management operations associated with event 220. Preferably, either content provider 110 or a system operator may access director client 420 to perform these operations.

Figure 5:
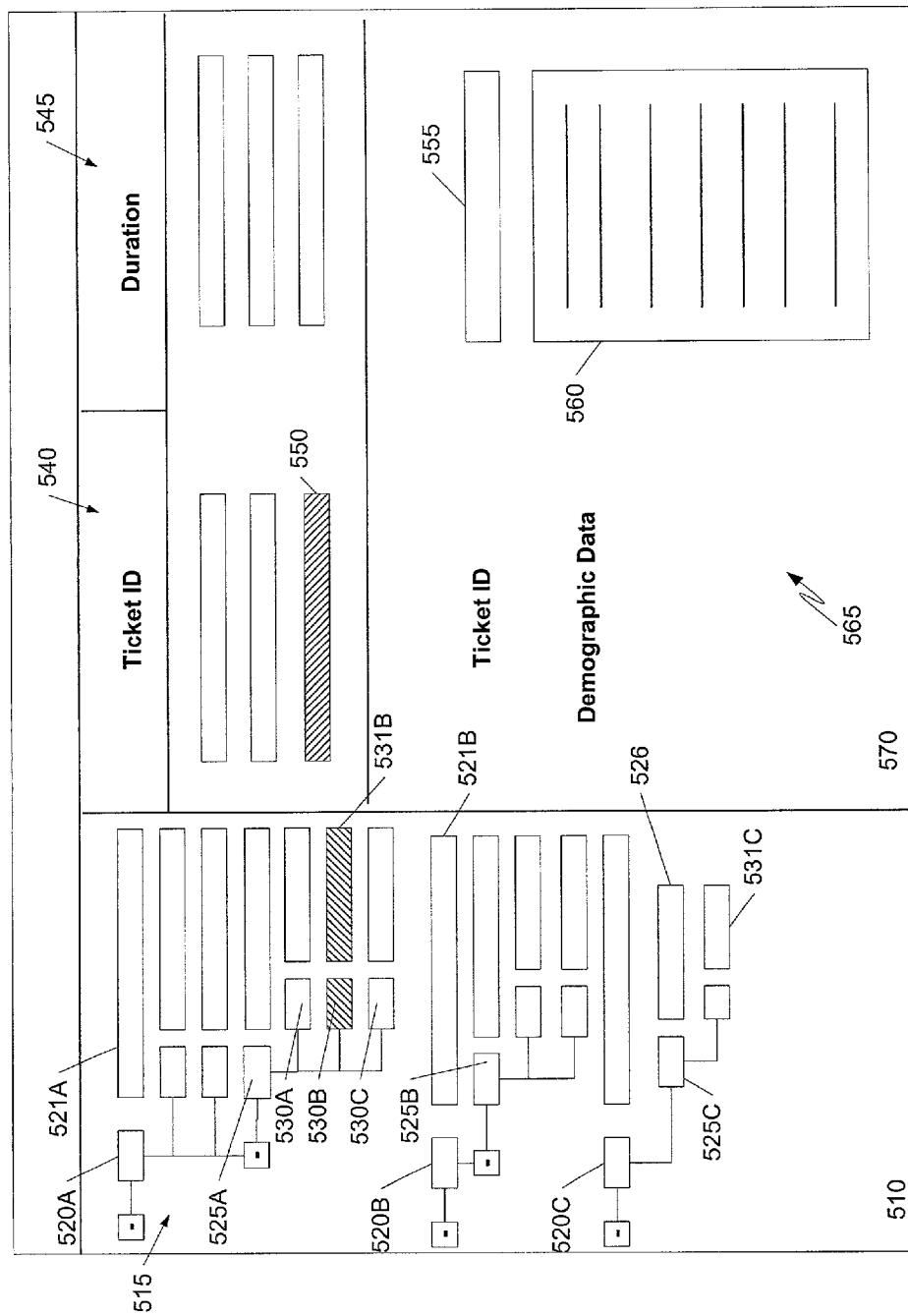
FIG. 5 illustrates a graphical user interface for monitoring delivery of an event.

FIG. 5 illustrates an exemplary graphical user interface ("GUI") 500 associated with director client 420 for providing information regarding the delivery of event 220. More particularly, FIG. 5 illustrates a GUI 500 that represents various performance and information aspects of the delivery of event 220 (referred to herein as delivery statistics) to one or more participants 120 arranged in a left GUI portion 510 and a right GUI portion 570.

Left GUI portion 510 includes a GUI tree structure 515 corresponding to hierarchy 300. GUI tree structure 515 represents the various levels of hierarchy 300 in a familiar "directory tree structure" such as that employed in various "file manager" applications. In this example, GUI tree structure 515 corresponds to hierarchy 300 for West Coast participant manager 310. Thus, a first level structure indicator 520A corresponds to California participant manager 320A; a first level structure indicator 520B corresponds to Oregon participant manager 320B; and first level structure indicator 520C corresponds to Washington participant manager 320C. Each first level structure indicator 520 may include information 521 (such as information 521A) that identifies its corresponding participant manager 130 and/or that summarizes aggregate delivery statistics corresponding to participants managers 130 attached beneath it.

Each first level structure indicator 520 may include one or more second level structure indicators 525. For example, a second level structure indicator 525A corresponds to Central California participant manager 330. Each second level structure indicator 525 may include information 526 that identifies its corresponding participant manager 130 and/or that summarizes aggregate delivery statistics corresponding to participants managers 130 attached beneath it.

Likewise, each second level structure indicator 525 may include one or more third level structure indicators 530. For example, second level structure indicator 525A includes a third level structure indicator 530A corresponding to San Jose participant manager 340BA, a third level structure indicator 530B corresponding to San Francisco participant manager 340A, and a third level structure indicator 530C corresponding to Oakland participant manager 340C. Again, each third level structure indicator may include information 531 that identifies its corresponding participant manager 130 and/or that summarizes aggregate delivery statistics corresponding to participant managers 130 attached beneath it.

Although described above as being associated with participant managers 130, any of structure indicators 520, 525, 530 may correspond to a particular participant 120. Likewise, each of structure indicators 520, 525, 530 may include information that identifies its corresponding participant 120 and/or that provides delivery statistics corresponding to participant 120.

As illustrated in FIG. 5, third level structure indicator 530B and its information 531B are highlighted. Preferably, when any of particular structure indicators 520, 525, 530 are highlighted in left GUI portion 510, information associated with the corresponding participant manager 130 is presented in right GUI portion 570. Thus, as illustrated in FIG. 5, right GUI portion 570 includes information corresponding to San Francisco participant manager 340A.

In a preferred embodiment of the present invention, right GUI portion 570 provides information associated with participants 120 organized below the corresponding participant manager 130 associated with the highlighted structure indicator in left GUI portion 510. In this example, right GUI portion 570 includes information corresponding to participants 350A, 350B and 350C organized below San Francisco participant manager 340A. If structure indicator 525A were highlighted in FIG. 5, right GUI portion 570 would include information corresponding to participants 350A-F.

In a preferred embodiment of the present invention, the information corresponding to participants 120 displayed in right GUI portion 570 includes a ticket ID 540 and a duration 545. Ticket ID 540 corresponds to an identification number of ticket 240 granted to a particular participant 120 whereby the particular participant was granted access to event 220 as will be discussed in further detail. Duration 545 corresponds to an amount of time that the particular participant 120 participated in the event (i.e., received the information stream). In some embodiments of the present invention, duration 545 may correspond to an amount of data (expressed in bytes or other suitable measure of data) delivered to the particular participant 120. Other information corresponding to participants 120 may be included as would be apparent.

As illustrated in FIG. 5, a particular ticket ID 550 is highlighted. In a preferred embodiment of the present invention, further information 565 is displayed in right GUI portion 570, for highlighted ticket ID's such as ticket ID 550. In one embodiment of the present invention, further information 565 includes demographic data 560 associated with the particular participant 120. This demographic information may include name, address, age, gender, household income, occupation, telephone number, and various other demographic information as would be apparent. In a preferred embodiment of the present invention, the particular participant 120, in exchange for ticket 240 to event 220, may have provided this demographic information.

System operators and content providers 110 may access director client 420 to monitor the delivery of event 220. Likewise after delivery of event 220, system operators and content providers 110 may access director client 420 to process the event 220 management data.

In a preferred embodiment of the present invention, director client 420 is used to determine demographic information associated with the delivery of a particular event 220. This demographic information may be used to target a direct advertising campaign or provide special offers to a subset of participants 120 on a demographic and/or geographic basis. Additional aspects of this embodiment are described in further detail below.

Director Server

Director server 410 provides various organizational and management functions of director 140, namely provisioning event 220, controlling delivery of event 220, logging delivery of event 220, and reporting delivery of event 220. Each of these are now described in further detail.

Event Provisioning

Director server 410 provides management tools to provision stadium 210 for events 220. Provisioning stadium 210 for events includes allocating, dispensing, and tracking tickets 240. In this regard, director server 410 may determine a maximum number of tickets 240 that can be dispensed by a particular content provider 110. This controls an amount of access the particular content provider 110 has to stadium 210. Director server 410 may also determine a maximum number of tickets 240 that can be dispensed for a particular event 220 in stadium 210. This controls a number of participants 120 to the particular event 220 and limits their attendant system requirements imposed on network communication system 105 (e.g., server capacity, bandwidth, etc.). Director server 140 may also determine a maximum number of tickets 240 that can be dispensed for any particular point in time per participant manager 130. This controls an amount of participants 120 accessing a particular point of presence in network communication system 105 to again limit the burden imposed on that particular point of presence (e.g., server capacity, number of modems, network bandwidth, etc.). Director server 140 may also determine a maximum number of tickets 240 that may be dispensed to participants 120 organized below any particular participant manager 130. By setting this maximum number to zero for some participant managers 130 and to a non-zero number for other participant managers 130, the director server 410 may control a geographic region (e.g., a country, a state, a county, a city, etc.) in which participants 120 can access event 220.

In a preferred embodiment of the present invention, director server 410 maintains a database of all tickets 240 that have been dispensed in stadium environment 100 and used within stadium 210. This database may include information associated with the particular participant 120 to which each ticket 240 is dispensed. These tickets 240 are maintained on a per event as well as a per participant manager for purposes of planning and provisioning addition resources in stadium environment 100.

Controlling Delivery of Event

Director server 410 also controls delivery of event 220 using a delivery method referred to as the SURL. The SURL is generated by director server 410 and resides on the web page provided by content provider 110 for a particular event 220. The SURL is implemented using a Java Applet, Servlet, HTML, or a combination of any of these or similar code scripting languages.

Figure 6:
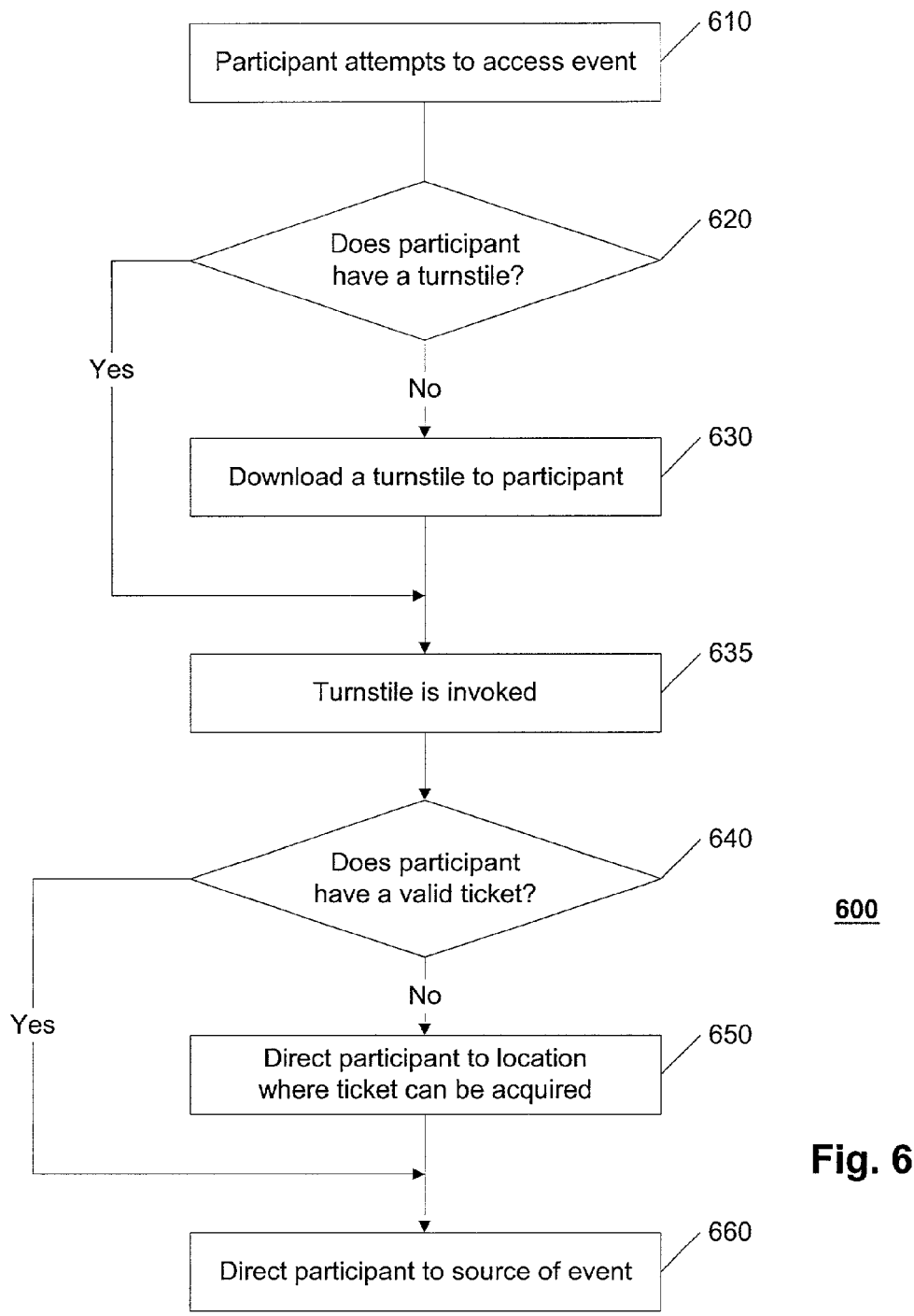
FIG. 6 illustrates an operation of a participant attempting to access an event according to one embodiment of the present invention.

FIG. 6 illustrates an operation of this delivery method as it delivers the particular event 220 to participant 120. In a step 610, participant 120 invokes the SURL by attempting to access the particular event on the web page. In a step 620, the delivery method determines whether participant 120 has turnstile 230. In a preferred embodiment of the present invention, the delivery method determines whether a particular directory is present on the receiving device of participant 120 and that files associated with turnstile 230 reside therein. Other mechanisms for determining whether participant 120 has turnstile 230 are available as would be apparent. If participant 120 has a turnstile, processing continues at a step 635; otherwise, in a step 630, turnstile 240 is downloaded and installed at participant 120.

In step 635, turnstile 230 is invoked. In a step 640, turnstile 230 determines whether participant 120 has ticket 240 corresponding to the particular event 220. In a preferred embodiment of the present invention, turnstile 230 determines whether a registry includes ticket 240 corresponding to the particular event 220. In addition, turnstile 230 authenticates ticket 240 to determine whether ticket 240 is a valid one. If participant 120 has ticket 240 corresponding to the particular event 220, processing continues at a step 660. Otherwise, if participant 120 does not have ticket 240, in a step 650, turnstile 230 directs participant 120 to an appropriate location where ticket 240 can be acquired such as director server 410, content provider 110, ticket provider 150, or some other source of ticket 240.

In step 660, after determining that participant 120 has turnstile 230 and ticket 240, turnstile 230 verifies ticket 240 was assigned to participant 120 and forwards ticket 240 to participant manager 130 for authentication. If the authentication process is successful, participant manager 130 will forward the CURL to turnstile 230. Turnstile 230 may direct participant 120 to access a multicast and/or unicast source associated with event 220. If the authentication process is not successful, processing continues at a step 650. In a preferred embodiment of the present invention, this access launches an event renderer thereby initiating delivery of event 220.

Logging Delivery of Event

Director server 410 also logs delivery of event 220. In particular, director server 410 collects log information from each participant manager 130 and mediates them, preferably into an XML file referred to as a Content Delivery Log, for each event 220 delivered. Content Delivery Log includes information associated with the delivery of event 220 to each participant 120. Preferably, this information includes event identification, ticket identification, user identification for billing, time participant joined and left event, duration of time on event, availability of service, and reason for leaving event (e.g., system failure, voluntary departure, etc.). Other information may be included in the Content Delivery Log as would be apparent.

Reporting on Delivery of Event

Director server 410 also provides various reports regarding event 220 to either system operators (e.g., stadium owners) or content providers 110. As would be apparent, various reports may be generated from data and delivery statistics associated with event 220, stadium 210, participants 120, participant managers 130, and/or content provider 110.

For example, one such report may provide information regarding ticket allocation with respect to a particular content provider 110 operating multiple events 220 in stadium 210. This report may provide: a number of tickets available to be distributed for all future events; a number of tickets allocated for current or pending events; a number of tickets to past or current events that were allocated but not dispensed to participants; a number of tickets that were dispensed to and actually used by participants; and a number of tickets that were dispensed to but not used by participants.

Another report may provide post-event information on the allocation of tickets to an individual event with the stadium. This report may provide: a number of tickets that were allocated to the event but were not dispensed; the number of tickets that were dispensed to and used by participants; and the number of tickets that were dispensed to but not used by participants.

Another report may provide pre-event information on the number of tickets that have been allocated and dispensed for a single event within a particular geographic region (i.e., within the domain of a particular participant manager). Still another report may provide pre-event statistics on the number of tickets that have been allocated and dispensed for all events within a particular geographic region.

Yet still another report may provide post-event information on the number of participants that actually used their ticket to participate in the event by geographic region. Another report may provide post-event information on the duration of participation for each participant by geographic region. Still another report may provide a number of tickets allocated and used based on the classification of the ticket.

Yet still another report may provide post-event information on the demographics of the participants of the event. The demographic data may include name, gender, age, address, e-mail address, phone number and marital status. The report may aggregate the demographic data by geographic region of the participants.

Various other reports may be generated including summary reports including any or all of the aforementioned reports as would be apparent.

Tickets

Tickets 240 provide a mechanism in stadium environment 100 for identifying, authenticating, measuring, and controlling participants 120 participating in events 220 within stadium 210. Each ticket 240 includes a unique identifier, preferably encrypted by itself or with other information, that is used to authenticate ticket 240, to provide security to event 220, and to associate any demographic or other participant information gathered by the system.

Tickets 240 may be of different types including, but not limited to, a single event ticket, a multi-event ticket (e.g., a season ticket), a time-based ticket (e.g., a three day pass), mobile tickets (e.g. ones that can be used by the same person but on multiple machines), a channel ticket, (e.g. one that allows access to an event or series of events without time boundaries), or a subscription ticket (e.g. weekly or monthly access). Different types of tickets 240 may specify different manners of delivery such as delivery at a regularly scheduled time versus delivery "on demand". Different types of tickets 240 may also specify one or more different classes of service (e.g. guaranteed quality of service "QoS" or best-effort delivery).

In a preferred embodiment of the present invention, ticket 240 includes first authentication information and second authentication information. First authentication is used by turnstile 230 to locally determine whether ticket 240 is a valid ticket (i.e., one provided by director server 410). Second authentication is used by participant managers 130 to actually authenticate that ticket 240 was provided to the particular participant 120 in possession of ticket 240. Ticket 240 may also include information associated with participant 120, information regarding a class of service, an address of participant managers 130 to which turnstile 230 should attach, and/or an address associated with advertising information to be provided to participant 120 during event 220.

As described above, in order for a participant 120 to participate in a particular event 220, participant 120 must acquire a ticket 240 to the particular event 220. Ticket 240 may be acquired at various locations within stadium environment 100 including ticket provider 150, content provider 110, and/or stadium 210. Ticket 240 may be acquired "in advance" or "at the door." Preferably, tickets 240 are acquired at a director server 410 associated with stadium 210 hosting event 220. Alternately, any of these locations may direct participant 120 to a single source of tickets 240 such as ticket provider 150. According to the present invention, ticket provider 150 includes any source of tickets 240 including commercial "bricks and mortar" sources.

Participant 120 may acquire a ticket 240 in various manners. In one embodiment of the present invention, participant 120 acquires ticket 240 by providing various demographic or survey information associated with participant 120. In exchange for this information, ticket provider 150 provides participant 120 with ticket 240.

In an alternate embodiment of the present invention, participant 120 acquires ticket 240 by providing payment information in exchange for ticket 240. Payment information may include billing information or an actual form of monetary compensation (e.g., cash, e-currency, etc.). In another embodiment of the present invention, participant 120 acquires ticket 240 by providing both demographic information and payment information. In this embodiment of the present invention, the payment information may entitle participant 120 to a higher class of service over those participants 120 only providing demographic information. In some embodiments of the present invention, ticket 240 is distributed to participant 120 with no payment information or demographic information required. In yet another embodiment of the present invention, participant 120 acquires ticket 240 by meeting predefined access criteria such as geographic location, age restrictions, software requirements or any number of other criteria that can be defined by the content provider.

Turnstile

Turnstile 230 functions as a gatekeeper to stadium 210 and event 220. Only those participants 120 with an appropriate ticket 240 are allowed to enter stadium 210 and participate in event 220.

In a preferred embodiment of the present invention, turnstile 230 operates as an interface between participant 120 and content provider 110 (or other source of event 220). Turnstile 230 also operates as an interface between participant 120 and participant manager 130. Preferably, turnstile 230 is a plug-in (or similar code portion) that is downloaded from director server 410 and installed at participant 120.

Figure 8:
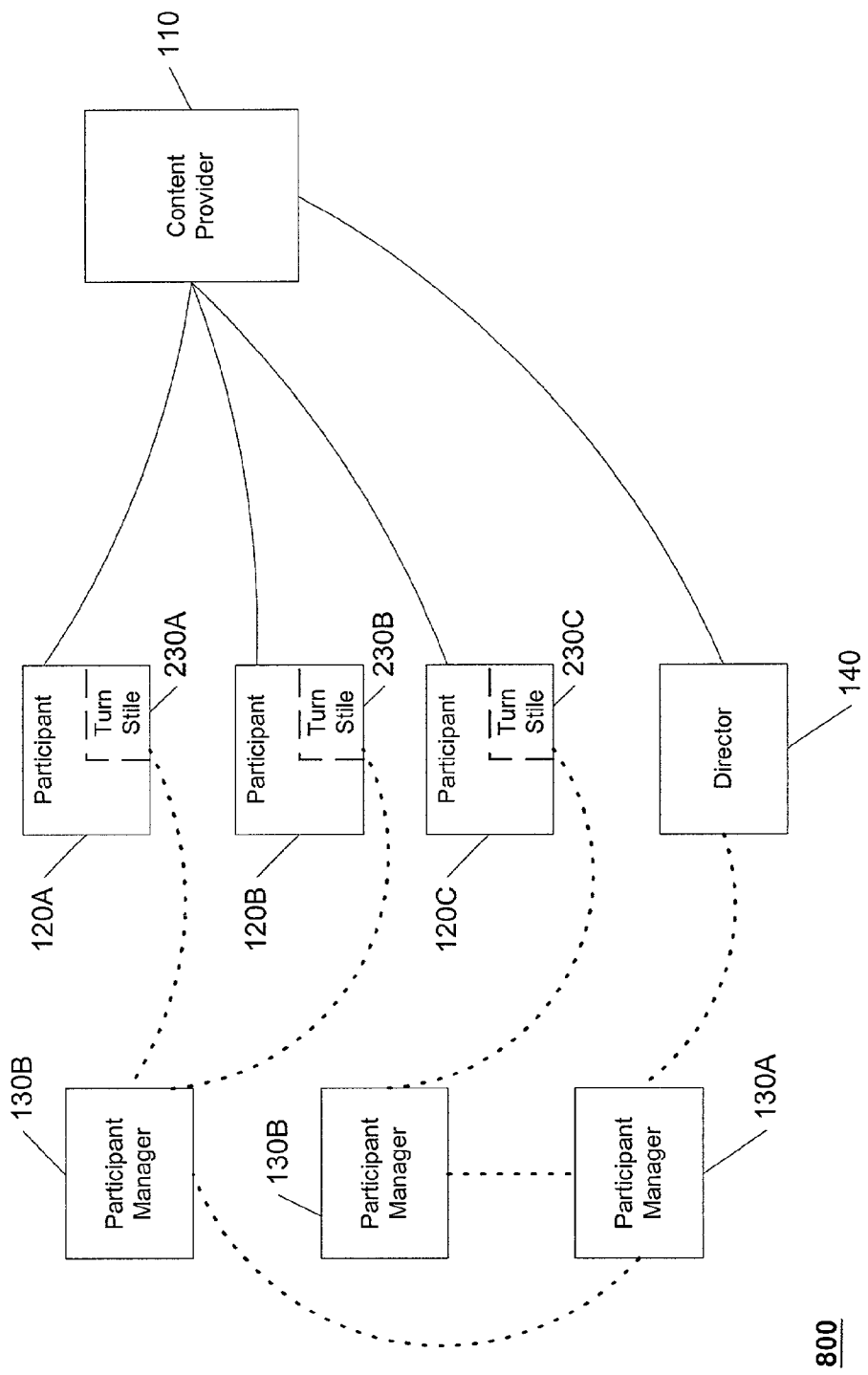
FIG. 8 illustrates a relationship among participants, participant managers, and content providers.

FIG. 8 illustrates a relationship among participants 120, turnstiles 230, participant managers 130, and content providers 110. As illustrated in FIG. 8, participants 120 receive event 220 from content provider 110 via a multicast or unicast enabled network communication system 105 (illustrated as solid lines in FIG. 8). Turnstiles 230, resident at each participant 120 monitor the delivery of event 220 and communicate delivery statistics upstream through a hierarchy 300 of participant managers 130 to director 140 via a separate protocol layer on network communication system 105 referred as a LEAP protocol (illustrated as dashed lines in FIG. 8).

Turnstile 230 identifies, authenticates, classifies, and controls participants 120 and their ability to access events 220. Turnstile 230 also monitors use by measuring a duration of time participant 120 accessed event 220 and/or an amount of data participant 120 received from event 220.

LEAP and SLEAP Protocols

The LEAP and SLEAP protocols implement a signaling and transport protocol for managing events 220 in stadium 210. SLEAP is an encrypted version of the LEAP protocol. The messaging between LEAP and SLEAP are the same, thus only LEAP will be described. The LEAP protocol is a lightweight transaction protocol built on top of the Internet Protocols such as TCP and UDP. The LEAP protocol enables unicast as well as multicast transactions. Most transactions within the LEAP protocol are reliable transactions. That is, each transaction is verified as successful or failed. This may be accomplished in various manners as would be apparent.

The LEAP facilitates many of the communications between components of stadium environment 100. More particularly, the LEAP protocol operates on turnstile 230, participant managers 130, and director server 410 to provide autodiscovery, self-organization, and communication among these components.

For example, turnstile 230, equipped with ticket 240, notifies stadium environment 100 of its desire to participate in event 220 by sending a "JOIN" message within the LEAP protocol to a particular participant manager 130 identified in ticket 240. The particular participant manager 130 determines whether ticket 240 is valid. If ticket 240 is a valid ticket, participant manager 130 responds with a "JOIN REPLY" message within the LEAP protocol indicating a successful joining of participant 120 to event 220. If ticket 240 is an invalid ticket, participant manager 130 responds with a JOIN REPLY message indicating that the joining failed and participant 120 is unable to gain access to event 220. When participant 120 leaves event 220, turnstile 230 sends a "LEAVE" message to the particular participant manager 130. Participant manager 130 responds with a "LEAVE ACKNOWLEDGEMENT" message.

The LEAP protocol is also used between and among participant managers 130 for various communications. A lower level participant manager 130 (also referred to as a "downstream" participant manager 130) associates itself with a higher level participant manager 130 (also referred to as an "upstream" participant manager 130) by sending an "ATTACH" message within the LEAP protocol to the upstream participant manager 130. The upstream participant manager 130 responds by sending an "ATTACH ACKNOWLEDGEMENT" message within the LEAP protocol to the lower level participant manager 130. Similarly, a participant manager 130 disassociates itself with another participant manager 130 by sending a "DETACH" message within the LEAP protocol. The participant manager 130 being disassociated responds by sending a "DETACH ACKNOWLEDGEMENT" message within the LEAP protocol.

Data is exchanged between components by using a "DATA" message. A requestor sends the "DATA" message to a requestee for data. The requestee responds with the requested data in a "REPLY" message back to the requestor. Many information exchanges are used in stadium environment 100. Examples of these include: director server 410 requesting that a particular participant manager 130 provide a list of all participants 120 attached to it; a downstream participant manager 130 requests that an upstream participant manager provide a list of all events 220 it has defined; and a participant manager 130 requests that a particular participant 120 provide statistics about itself.

Some information exchanges in the LEAP protocol are not transactions but controlled messages that flow upstream. These messages flow upstream at some requested configurable rate from a downstream entity such as a participant 120 or lower level participant manager 130 to a upstream entity such as a higher level participant manager 130 or director server 410. Examples of these messages include: aggregate participant statistic messages, dynamic topology messages indicating changes in hierarchy 300, and event specific statistic messages.

Figure 9:
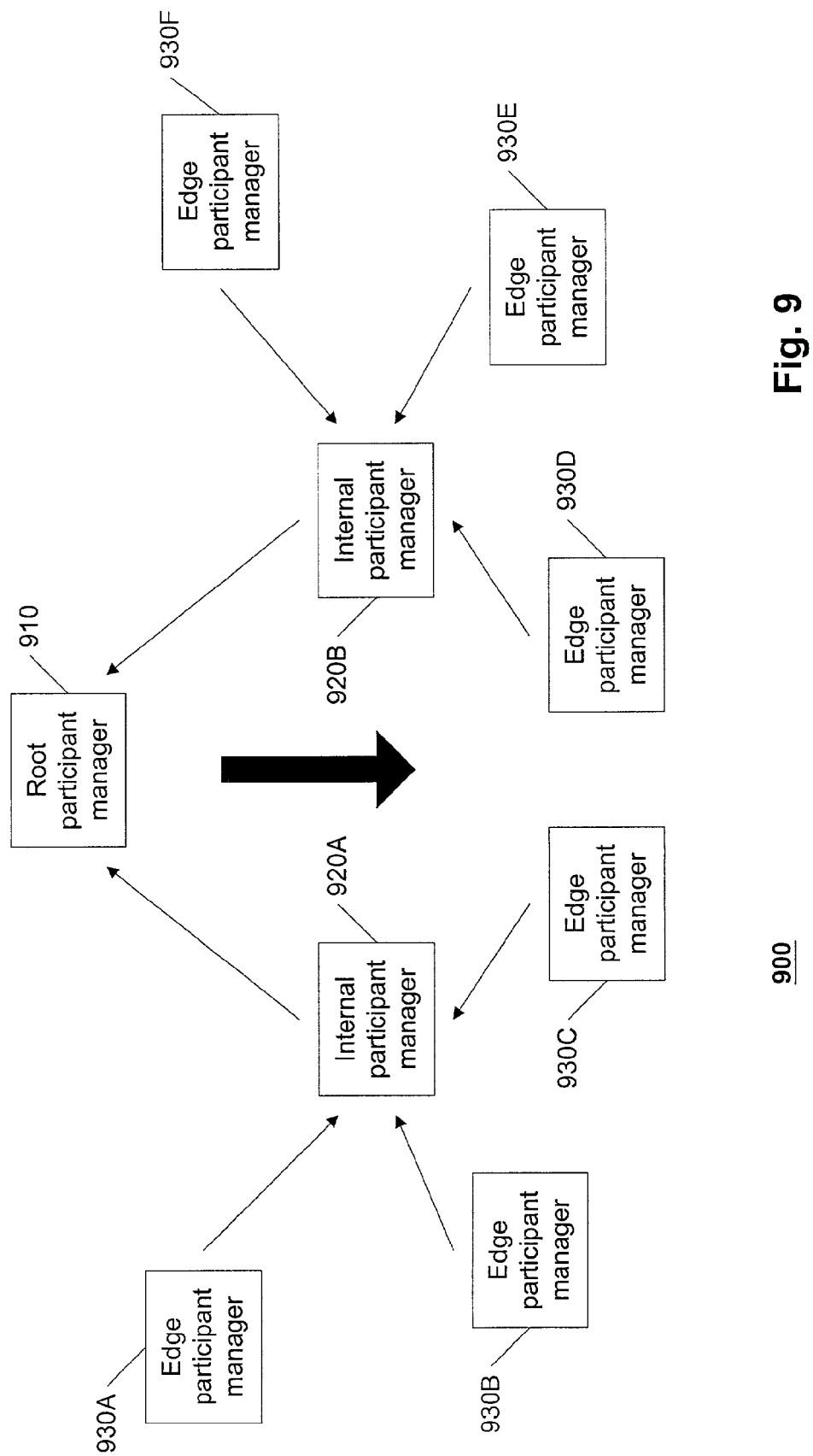
FIG. 9 illustrates a cast transaction according to one embodiment of the present invention.

Another type of information exchange in the LEAP protocol are referred to as casts. Casts are multicast transactions where the REPLY messages are aggregated to indicate success or failure of the cast. FIG. 9 illustrates a participant manager hierarchy 900 operating with a cast transaction. Hierarchy includes a root participant manager 910, one or more internal participant managers 920, and one or more edge participant managers 930. Root participant manager 910 is the highest level participant manager in hierarchy 900. Internal participant managers 920 represent one or more levels of mid-level participant managers. Edge participant managers 930 represent the lowest level participant managers in hierarchy 900. Attached to edge participant managers 930 are participants 120.

In the cast transaction, root participant manager 910 multicasts a "DATA" message to all other participant managers in hierarchy 900. Edge participant managers 930 that received the multicasted DATA message respond by sending an affirmative "REPLY" message upstream, in this example, to one or internal participant managers 920. Thus, if edge participant manager 930B receives the multicasted DATA message, it sends an affirmative "REPLY" message to internal participant manager 920A. Similarly, if edge participant manager 930F receives the multicasted DATA message, it sends an affirmative "REPLY" message to internal participant manager 920B.

Internal participant managers 920 only respond to the multicasted DATA message if and when all their downstream participant managers have responded. In this example, internal participant manager 920A sends an affirmative "REPLY" message to root participant manager 910 only after receiving affirmative REPLY messages from each of participant managers 930A-C. Likewise, internal participant manager 920B sends an affirmative "REPLY" message to root participant manager 910 only after receiving affirmative REPLY messages from each of participant managers 930D-F. The cast transaction is complete when a REPLY message has been received from all participant managers.

In the event that some participant managers fail to receive the initial DATA message, the cast fails, preferably via a timeout waiting on the REPLY message. In a preferred embodiment of the present invention, a localized retransmission of the DATA message is sent. In other words, an upstream participant manager that received the DATA message and that has not received a REPLY from a downstream participant manager sends the DATA message directly to that downstream participant manager.

Autodiscovery Algorithm

Figure 10:
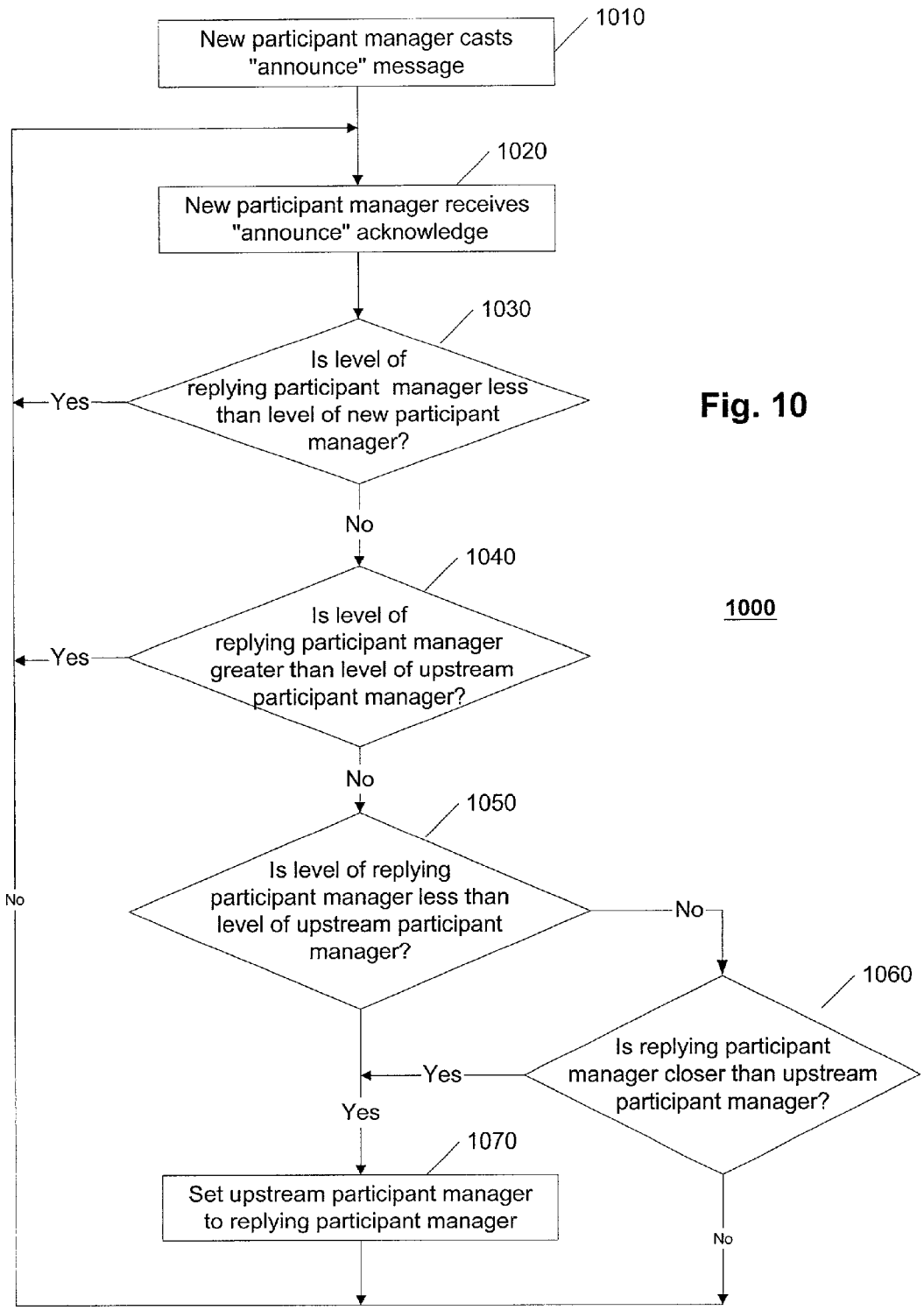
FIG. 10 illustrates an operation of an autodiscovery algorithm from the perspective of a new participant manager according to a preferred embodiment of the present invention.
Figure 17:
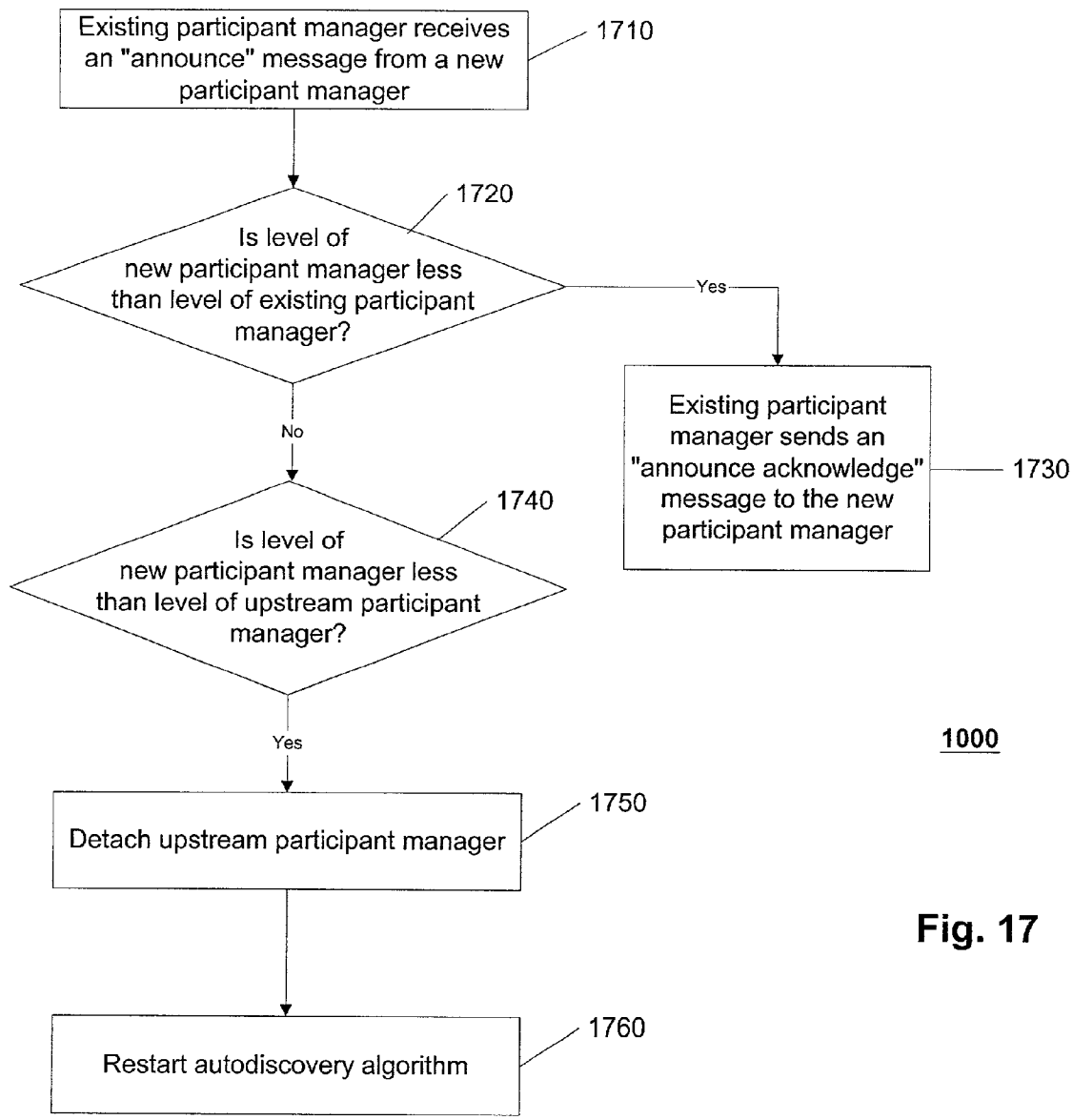
FIG. 17 illustrates an operation of an autodiscovery algorithm from the perspective of an existing participant manager according to a preferred embodiment of the present invention.

According to the present invention, participant managers 130 form themselves into hierarchy 300 using an autodiscovery algorithm 1000 illustrated in FIG. 10 and FIG. 17. Autodiscovery algorithm defines the process by which participant managers 130 discover their relationships to other participant managers in hierarchy 300.

Before discussing the algorithm itself, some characteristics of participant managers 130 are briefly described. Each participant manager 130 is assigned a level within hierarchy 300. As discussed above, this level preferably varies between 0 (the lowest level) and 255 (the highest level). These levels are assigned during system design and implementation so that the lowest level participant managers 130 preferably reside near participants 130 both logically (in terms of network address or number of "hops") and geographically (in terms of physical location). Higher level participant managers 130 are similarly organized around the lower level participant managers 130. One example of such organization was described above with respect to FIG. 3.

Each participant manager 130 is likewise assigned a network address. While it would seem simple to merely arrange hierarchy 300 by having various lower level participant managers 130 report directly to a particular higher level participant manager 130 via this address, such an arrangement does not provide the self-organizing or self-healing features of the present invention. For example, if the particular higher level participant manager 130 fails, the lower level participant managers 130 assigned to it have no mechanism for reestablishing themselves in hierarchy 300. Similarly, the addition of a new participant manager 130 to hierarchy 300 would require that at least some of the lower level participant managers 130 be manually reassigned.

Autodiscovery algorithm 1000 however, provides both self-organizing and self-healing features by allowing participant managers 130 to locate one another and arrange themselves in hierarchy 300. A preferred embodiment of autodiscovery algorithm 1000 with respect to a new participant manager 130 joining hierarchy 300 is now described with reference to FIG. 10.

In a step 1010, the new participant manager 130 casts an "ANNOUNCE" message on a multicast address within stadium environment 100. Preferably, this multicast address is associated with a particular stadium 210 to which the new participant manager 130 is assigned. The new participant manager 130 is "new" in the sense that it is not yet a member of hierarchy 300 and is desirous of discovering its place therein. The ANNOUNCE message includes a unicast address and a level associated with the new participant manager 130 to which other participant managers 130 should respond.

In a step 1020, the new participant manager 130 receives an "ANNOUNCE ACKNOWLEDGE" message from a replying participant manager 130. The ANNOUNCE ACKNOWLEDGE message includes a unicast address and a level associated with the replying participant manager 130.

In a step 1030, the new participant manager 130 determines whether the level of the replying participant manager 130 is less than its own level. If so, the response is ignored, and processing continues at step 1020 to evaluate responses from other participant managers 130. Otherwise, processing continues at a step 1040.

In step 1040, the new participant manager 130 determines whether the level of the replying participant manager 130 is greater than the level of an upstream participant manager 130 that the new participant manager 130 believes is the next higher level above his. This participant manager 130 is referred to as a current upstream participant manager and identifies the participant manager 130 to which the new participant manager is attached in hierarchy 300. If the level of the replying participant manager 130 is greater than the level of the current upstream participant manager, then the response is ignored, and processing continues at step 1020 to evaluate responses from other participant managers 130. Otherwise, processing continues at a step 1050.

In step 1050, the new participant manager 130 determines whether the level of the replying participant manager 130 is less than the level of the current upstream participant manager 130. If so, processing continues at a step 1070. Step 1070 is arrived at when the replying participant manager 130 has a level in between that of the new participant manager 130 and that of the current participant manager 130. This would indicate that the replying participant manager 130 should be identified as the current participant manager 130. In step 1070, the replying participant manager is identified as the current participant manager 130. In a preferred embodiment, this is accomplished by sending an ATTACH message to the replying participant manager 130 and a DETACH message to the current participant manager 130. Once step 1070 is completed, processing continues at step 1020 to evaluate responses from other participant managers 130.

If in step 1050 the level of the replying participant manager 130 is not less than the level of the current upstream participant manager 130, processing continues at a step 1060. Step 1060 is arrived at when the level of the replying participant manager 130 and that of the current upstream participant manager 130 are the same. When this occurs, the new participant manager 130 preferably attaches itself to the closest of the two same level participant managers 130. In step 1060, the new participant manager 130 determines whether the replying participant manager 130 is closer than the current upstream participant manager 130. This may be accomplished by determining a number of hops between the new participant manager and each of the same level participant managers assuming that participant managers with fewer hops between one another are located physically closer to one another than those with more hops. Ties in the number of hops are resolved in favor of the participant manager with the closest network address.

In step 1060, if the replying participant manager 130 is closer than the current upstream participant manager, then processing continues at step 1070 where the replying participant manager is identified as the current participant manager as described above. Otherwise, processing continues at step 1020 to evaluate responses from other participant managers 130. Autodiscovery algorithm 1000 is repeated until the new participant manager no longer receives further ANNOUNCE ACKNOWLEDGE messages. This portion of autodiscovery algorithm 1000 establishes the upstream connections of the new participant manager 130 within hierarchy 300.

FIG. 17 illustrates autodiscovery algorithm 1000 from the perspective of a participant manager 130 already existing in hierarchy 130. This portion of autodiscovery algorithm 1000 now described establishes the downstream connections of the new participant manager 130 within hierarchy 300.

In a step 1710, an existing participant manager 130 receives an ANNOUNCE message from the new participant manager 130. The participant manager 130 is "existing" in the sense that it is already attached in hierarchy 300. In a step 1720, the existing participant manager 130 determines whether the level of the new participant manager 130 is less than its own level. If so, in a step 1720, the existing participant manager 130 responds by sending an ANNOUNCE ACKNOWLEDGEMENT message as discussed above. Otherwise processing continues at a step 1740.

In step 1740, the existing participant manager 130 determines whether the level of the new participant manager 130 is less than the level of the current upstream participant manager 130. If so, the new participant manager 130 is closer than the current upstream participant manager 130, and processing continues at a step 1750. Otherwise, the ANNOUNCE message from the new participant manager 130 is ignored.

In step 1750, because the new participant manager 130 is closer than the current upstream participant manager 130, the existing participant manager 130 detaches from the current upstream participant manager 130. In a step 1760, the existing participant manager 130 restarts autodiscovery algorithm 1000 by casting an ANNOUNCE message in step 1010.

As an example, hierarchy 300 may be obtained using autodiscovery algorithm 1000 with the following levels assigned to each of the components: for director 140, LEVEL=255; for West Coast participant manager 310, LEVEL=200; for California participant manager 320A, Oregon participant manager 320B, and Washington participant manager 320C, LEVEL=150; for Central California participant manager 330, LEVEL=80; for San Francisco participant manager 340A, San Jose participant manager 340B, and Oakland participant manager 340C, LEVEL=20; and for participants 350, LEVEL=0.

System Operation

The operation of stadium environment is now described from a perspective of each of the following components: participant 120, turnstile 230, participant manager 130, director server 410, and finally, director client 420.

Participant's Perspective

Figure 11:
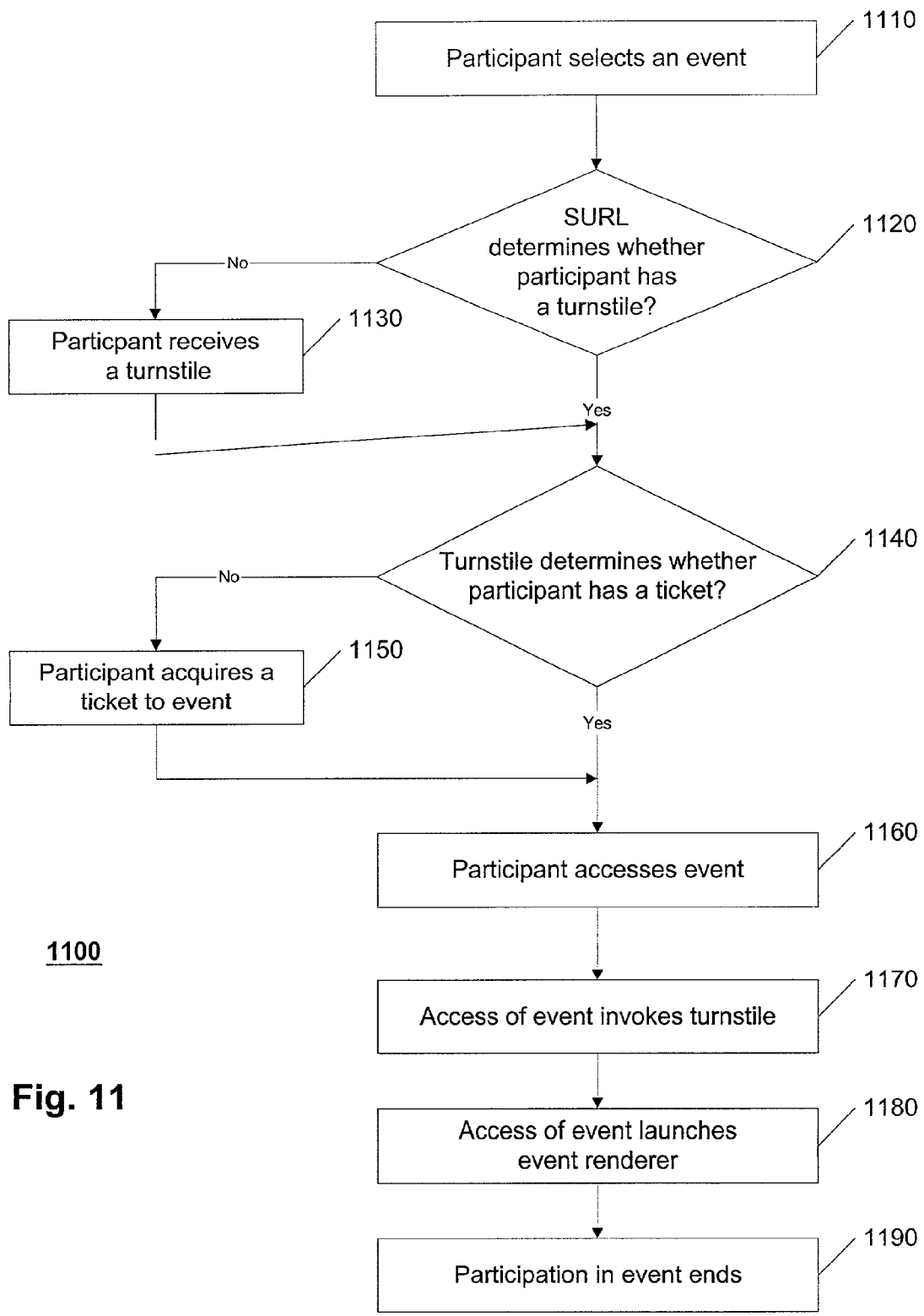
FIG. 11 illustrates an operation of the present invention from a perspective of a participant.

FIG. 11 illustrates an operation 1100 of stadium environment 100 from a perspective of a participant 120 according to one embodiment of the present invention. In a step 1110, participant 120 preferably selects an event 220 from either a web page provided by content provider 110 or from stadium 210. In alternate embodiments, participant 120 may be delivered a link to event 220 via an e-mail, a URL address or other mechanism.

In a step 1120, after selecting event 220, director server 410 determines whether participant 120 has turnstile 230 installed. In a preferred embodiment of the present invention, this is accomplished using the SURL delivery method as described above. If the SURL determines that turnstile 230 is installed processing continues at a step 1140. Otherwise, in a step 1130, participant 120 receives a turnstile 230 from director server 410.

In step 1140, in one embodiment, turnstile 230 determines whether participant 120 has a valid ticket 240 to event 220. In an alternate embodiment, the SURL determines if participant 120 has a valid ticket 240 to event 220. If turnstile 230 determines that participant 120 has a valid ticket, processing continues at a step 1160. Otherwise, in a step 1150, participant 120 acquires a ticket 240 to event 220. In a preferred embodiment of the present invention, turnstile 230 directs participant 120 to a location where participant 120 may acquire ticket 240.

In step 1160, participant 120 accesses event 220, or more particularly, accesses a multicast or unicast address associated with event 220 as provided by the SURL delivery method from director server 410. This access initiates delivery of event 220. In a step 1170, this access invokes turnstile 230 at participant 120 if not already invoked. In a step 1180, this access also preferably launches an event renderer at participant 120. In an alternate embodiment of the present invention the director and/or the participant manager confirms participant has met established content access criteria (e.g. valid geographic location, age, time period, authentication, and billing information verification).

In a step 1190, participant's 120 participation in event 220 ends. In one embodiment of the present invention, participant 120 closes the event renderer thereby ending participation in event 220. Alternately, the delivery of event 220 is completed thereby ending participation in event 220.

Turnstile's Perspective

Figure 12:
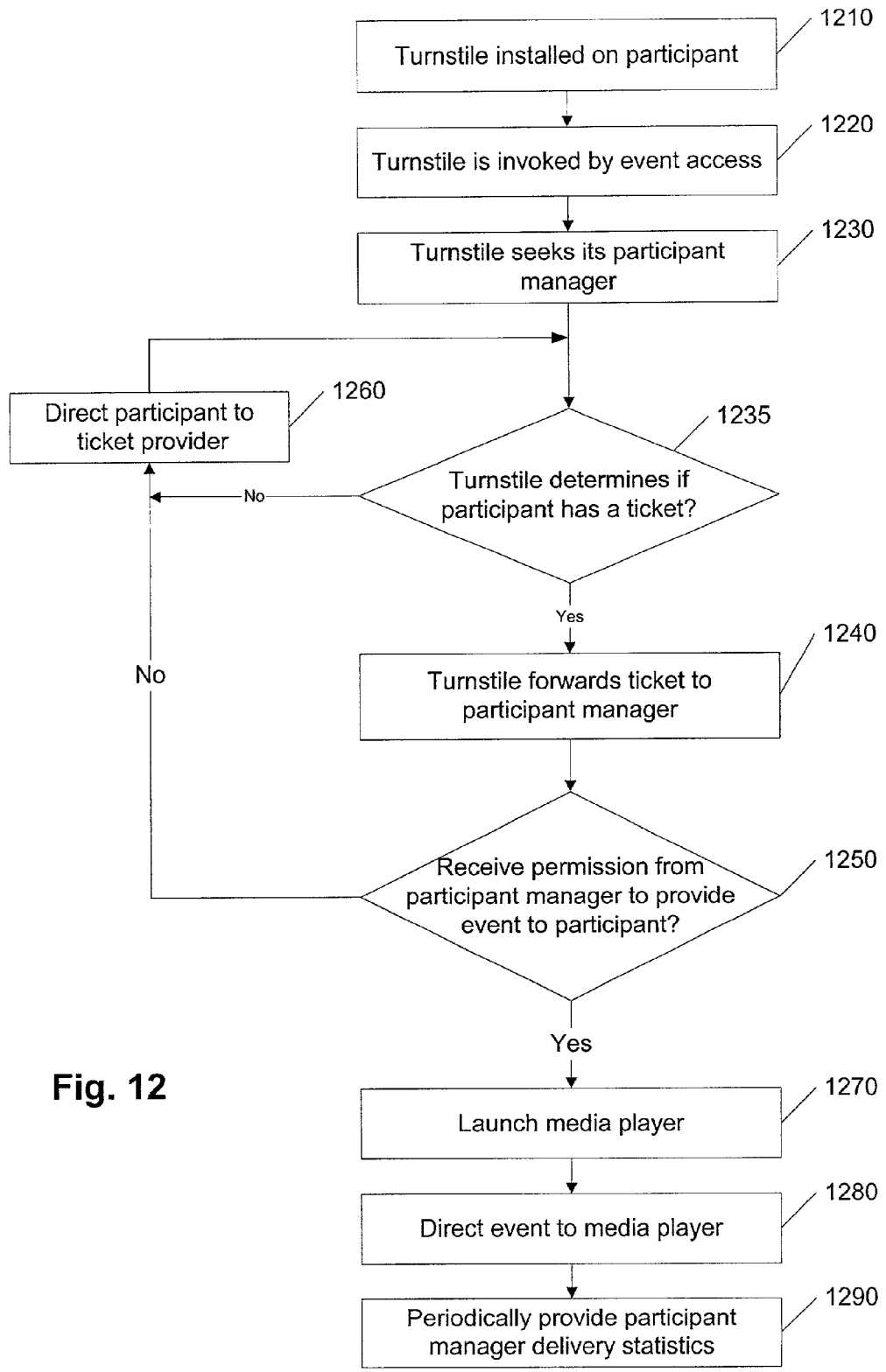
FIG. 12 illustrates an operation of the present invention from a perspective of a turnstile.

FIG. 12 illustrates an operation 1200 of stadium environment 100 from a perspective of turnstile 230 according to the present invention. In a step 1210, turnstile 230 is installed onto participant 120.

In a step 1220, turnstile 230 is invoked when participant 120 accesses event 220. In a first embodiment of the present invention, turnstile 230 is invoked when participant 120 attempts to access a CURL associated with event 220. In this embodiment, turnstile 230 prohibits participant 120 from joining the multicast until various requirements (e.g. authorization from participant manager 130) are met.

In a second embodiment of the present invention, turnstile 230 is a wrapper (e.g., Java applet, Active-X control, etc.) around the event renderer that intercepts signaling to the event renderer thereby prohibiting its launch, until the various requirements are met.

In a step 1230, turnstile 230 locates its corresponding participant manager 130 in hierarchy 300. In one embodiment of the present invention, turnstile 230 invokes autodiscovery algorithm 1000 as described above to seek out its corresponding participant manager. In an alternate embodiment of the present invention, turnstile 230 determines an address to its corresponding participant manager 130 from ticket 240. In yet another alternate embodiment of the present invention, turnstile 230 is pre-assigned one or more address(es) of the corresponding participant manager 130 based on a variety of criteria such as point of entry to the network, geographic location, network congestion and network performance.

Once located in hierarchy 300, in a step 1235, turnstile 230 determines if participant 120 has a valid ticket 240. If not, in a step 1260, turnstile 230 directs participant 120 to ticket provider 150. Otherwise, processing continues at a step 1240.

In step 1240, turnstile 230 forwards ticket 240 corresponding to event 220 to participant manager 130. In a preferred embodiment of the present invention, turnstile 230 forwards ticket 240 to participant manager 130 in conjunction with a JOIN message to participant manager 130.

In a step 1250, turnstile 230 receives a message from participant manager 130 indicating whether participant 120 has authorization to participate in event 220. Preferably, this is accomplished by receiving a JOIN REPLY message from participant manager 130. If the message from participant manager 130 indicates that participant 120 has authorization to participate in event 220, provides the CURL for the event and processing continues at a step 1270. Otherwise, in step 1260, turnstile 230 directs participant 120 to ticket provider 150 where ticket 240 can be acquired.

In step 1270, the event renderer at participant 120 is launched as discussed above to render event 220. In a step 1280, turnstile 230 directs the event renderer to a source of the information stream associated with event 220, from which the event renderer collects the information stream and renders it for participant 120.

In a step 1290, turnstile 230 periodically gathers delivery statistics associated with the delivery of event 220 and QoS statistics associated with the event renderer to participant 120 and forwards them to participant manager 130. In one embodiment, turnstile 230 gathers and forwards delivery statistics at a start and end of event 220. In another embodiment, turnstile 230 gathers and forwards delivery statistic at a particular rate (e.g. once every two seconds). In yet another embodiment, turnstile 230 gathers and forwards delivery statistics when queried by director server 410 or one of participant managers 130.

Participant Manager's Perspective

Figure 13:
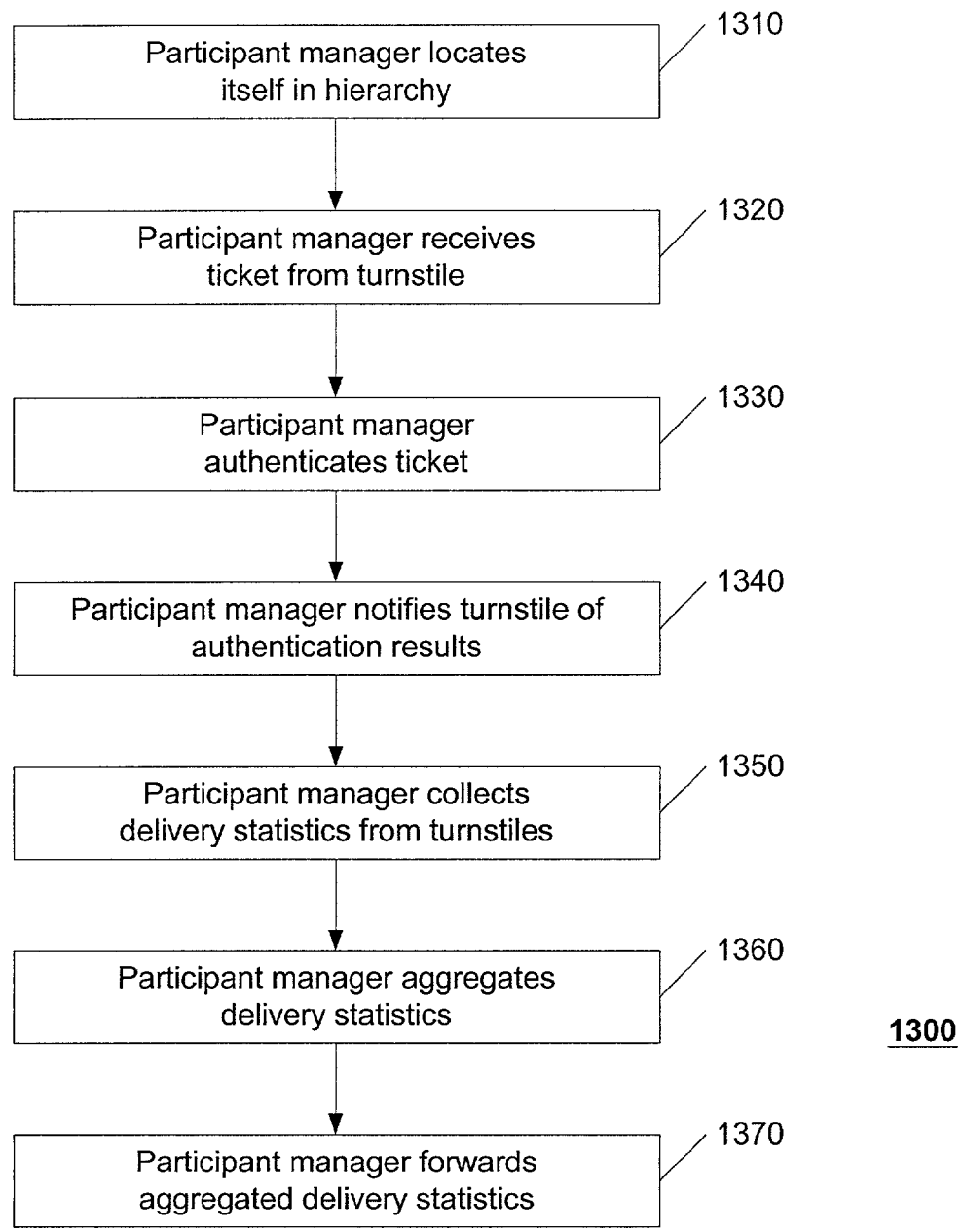
FIG. 13 illustrates an operation of the present invention from a perspective of participant manager.

FIG. 13 illustrates an operation 1300 of stadium environment 100 from a perspective of participant manager 130 according to the present invention.

In a step 1310, participant manager 130 locates itself with hierarchy 300. Preferably, participant manager 130 does so using autodiscovery algorithm 100 as described above. Once so located, at some point in time, participant manager 130 receives a ticket 240 from turnstile 230 accompanied by a request to authenticate ticket 240.

In a step 1330, participant manager 130 attempts to authenticate ticket 240. As discussed above, participant manager 130 uses second authentication information included in ticket 240 to verify that ticket 240 was provided to participant 120. In a step 1340, participant manager 130 notifies turnstile 230 of the results of the authentication.

In a step 1350, participant manager 130 collects delivery statistics from turnstile 230. Preferably, participant manager 130 collects delivery statistics from each of turnstiles 230 below it in hierarchy 300. In a step 1360, participant manager 130 aggregates the delivery statistics from each of turnstiles 230. In a step 1370, participant manager 130 forwards the aggregated delivery statistics to the upstream participant manager 130. Preferably, each level of participant managers 130 aggregate the delivery statistics so that they are correlated from root to leaf at any point in time within hierarchy 300.

For example, San Francisco participant manager 340A aggregates delivery statistics from participants 350A-C and forwards them to Central California participant manager 330. Similarly, Central California participant manager 310 aggregates delivery statistics from San Francisco participant manager 340A, San Jose participant manager 340B, and Oakland participant manager 340C and forwards them to California participant manager 320A. Each higher level participant manager 130 aggregates and forwards delivery statistics from those participant managers immediately beneath it until director server 410 receives the aggregated delivery statistics representing all participants 120 of a particular event 220.

The delivery statistics may include: an identification of event 220, an identification of participant manager 130 forwarding the statistics, a number of participants 120 directly attached to the participant manager 130, and an aggregate number of participants 120 indirectly attached to the participant manager 130 through lower level participant managers 130. Delivery statistics may also include a time a particular participant 120 joined particular event 220, and/or a time the particular participant 120 left the particular event 220, the packets transferred and/or dropped, number of frames, average bandwidth at the client, latency and other statistics that are available from the viewer.

Director Server's Perspective

Figure 14:
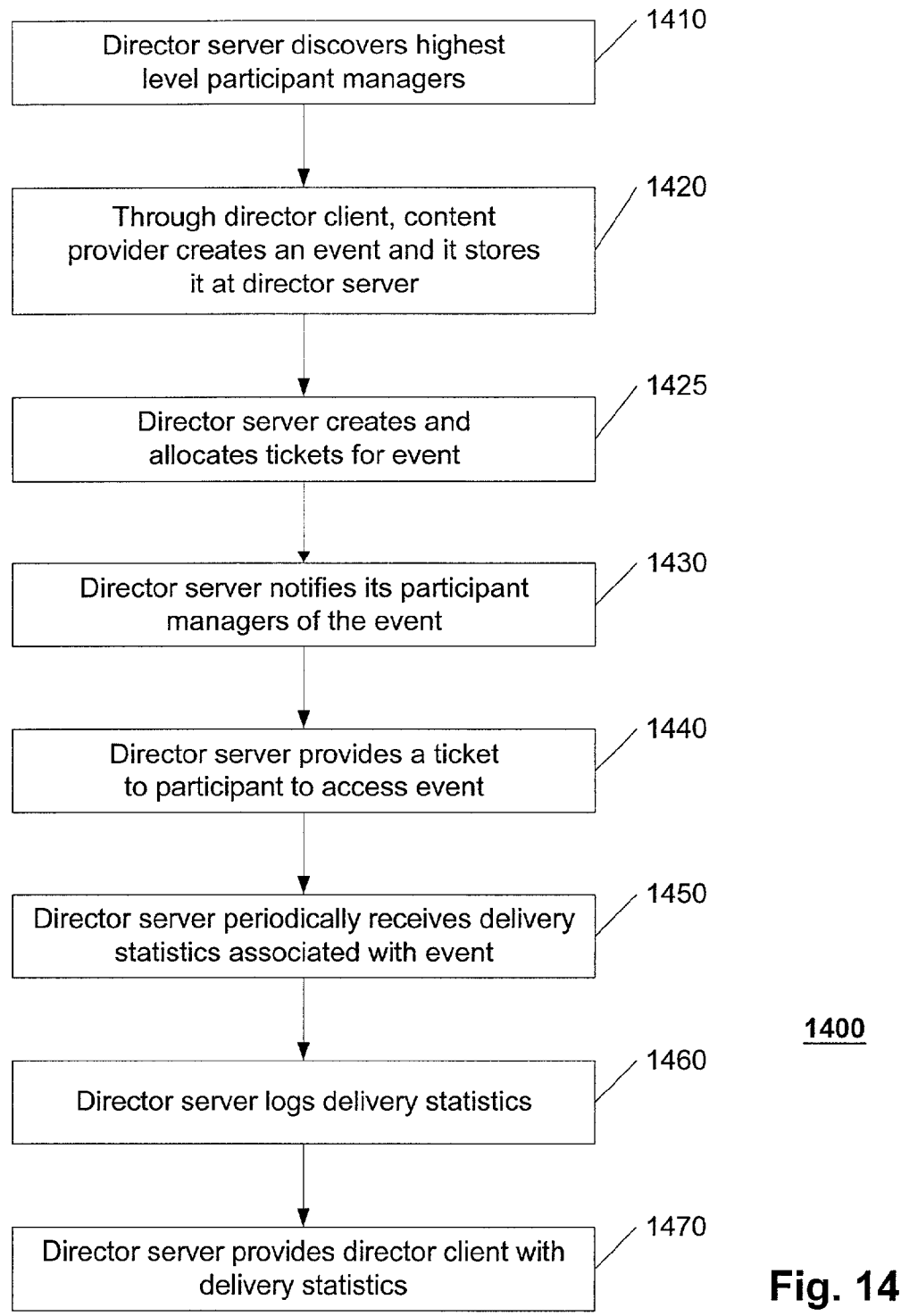
FIG. 14 illustrates an operation of the present invention from a perspective of director server.

FIG. 14 illustrates an operation 1400 of stadium environment 100 from a perspective of director server 410 according to the present invention. After director server 410 is installed and started, in a step 1410, director server 410 locates the highest level participant managers 130 in hierarchy 300. In one embodiment of the present invention, director server 410 locates the highest level participant managers 130 using auto-discovery algorithm 1000. For example, as illustrated in FIG. 3, director 140 (i.e., director server portion 410) discovers West Coast participant manager 310 as well as any other participant managers 130 sharing the same level (not illustrated). In another embodiment of the present invention, director server 410 knows ahead of time the address of the highest level participant managers 130.

In a step 1420, content provider 110 creates event 220 at director server 410 using director client 420. In a step 1425, director server 410 creates and allocates tickets 240 for event 220. In a preferred embodiment of the present invention, creating event 220 includes describing all properties of event 220 including, but not limited to, advertisements associated with event 220 and to the provisioning of tickets 240 for event 220. In a step 1430, director server 410 notifies its participant managers 130 of event 220. In particular, director server 410 preferably supplies its participant managers 130 with an identification of event 220, a duration of event 220, and a duration during which participants 120 are allowed to join. In a step 1440, director server 410 provides a ticket 240 to participant 120 to access event 220.

In a step 1450, director server 410 periodically receives delivery statistics associated with event 220 from its participant managers 130. In a step 1460, director server 410 logs these delivery statistics as discussed above. In a step 1470, director server 410 provides director client 420 with the delivery statistics so that content provider 110 or a system operator can view the delivery statistics.

Figure 15:
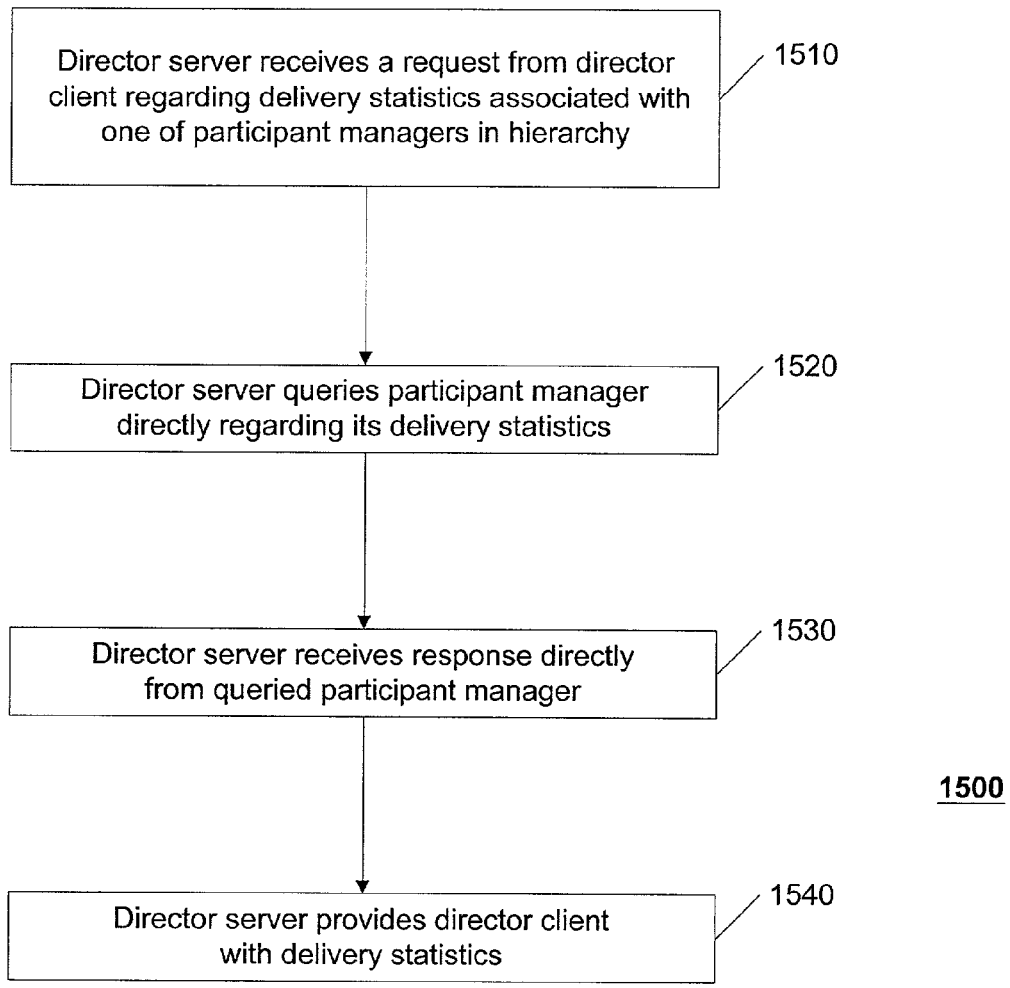
FIG. 15 illustrates an operation of the present invention from a perspective of director server gathering delivery statistics from a particular participant manager.

FIG. 15 illustrates an operation 1500 of director server 410 responding to a query from director client 420 with respect to delivery statistics associated with a particular participant manager 130 in hierarchy 300. In a step 1510, director server 410 receives a request from director client 420 regarding the delivery statistics associated with one of participant managers 130 in hierarchy 300. Preferably, this request can be made for any of participant managers 310, 320, 330, and 340, or participants 350 in hierarchy 300.

In a step 1520, director server 410 queries the particular participant manager 130 directly. In a step 1530, director server 410 receives delivery statistics directly from the queried participant manager 130. In a step 1540, director server 410 provides director client 420 with the requested delivery statistics associated with the particular participant manager 130 in hierarchy 300.

Director Client's Perspective

Figure 16:
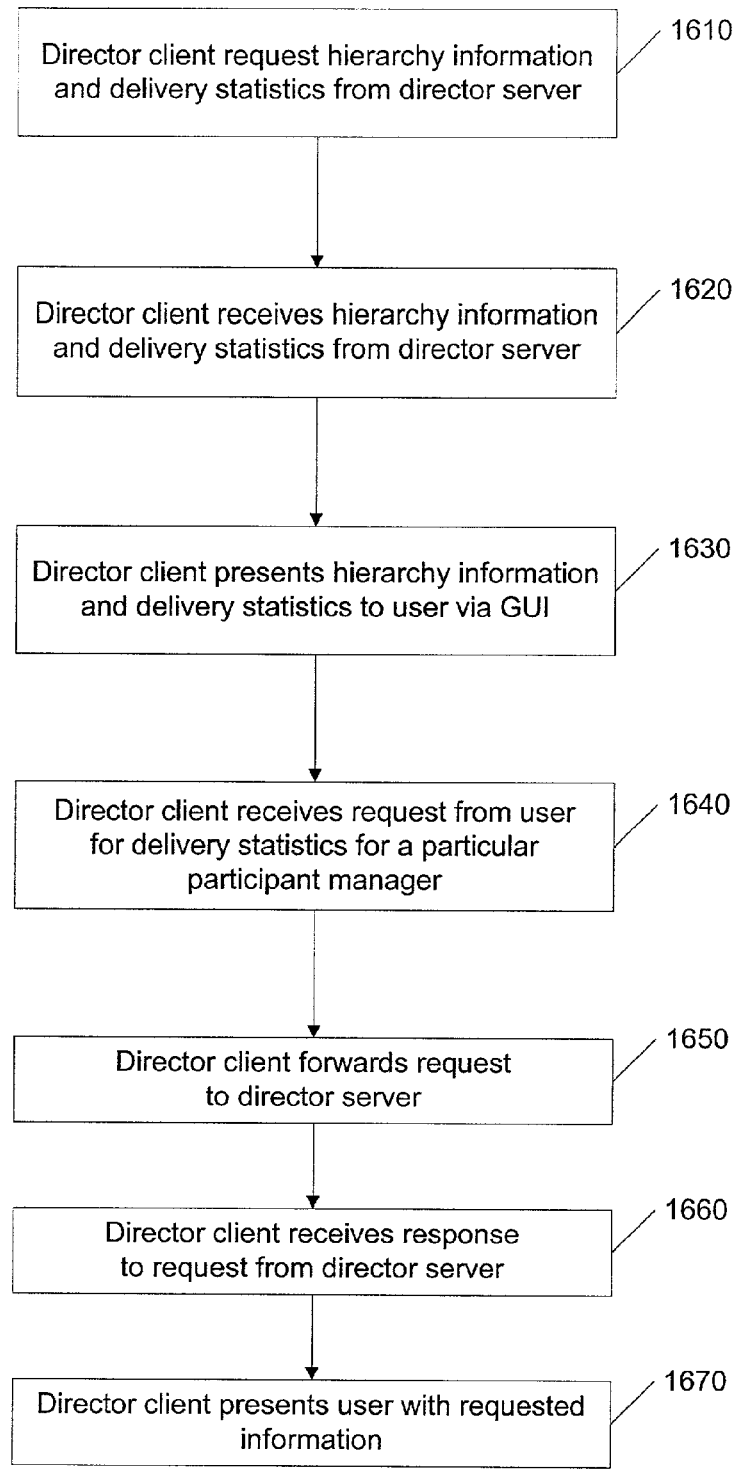
FIG. 16 illustrates an operation of the present invention from a perspective of director client.

FIG. 16 illustrates an operation 1600 of stadium environment 100 from a perspective of director client 420 according to the present invention. Operation 1600 is now described with reference to FIG. 5.

In a step 1610, after being installed at a user (i.e., either content provider 110 or a system operator) director client 420 requests information regarding hierarchy 300 and delivery statistics associated therewith for a particular event 220 from director server 410. In a step 1620, director client 420 receives the requested information from director server 410. In a step 1630, director client 420 presents the user with a graphic user interface such as GUI 500 illustrated in FIG. 5. Preferably, an initial presentation of hierarchy 300 in GUI 500 includes director server 410 and its participant managers 130 (i.e. the highest level participant managers 130 in hierarchy 300 directly connected to director server 410 such as West Coast participant manager 310). Furthermore, the aggregated delivery information associated with event 220 is preferably presented in GUI 500 with respect to director server 410 with its constituent components broken down for each of participant managers 130.

In a step 1640, director client 420 receives a request from the user for delivery statistics with respect to a particular participant manager 130. In a step 1650, director client 420 forwards the request to the particular participant manager 130. In a step 1660, the director client 420 receives the requested delivery statistics directly from the particular participant manager 130. In a step 1670, director client 420 presents the user with an updated GUI 500 with the delivery statistics for the particular participant manager 130.

Director client 420 provides the user with several mechanisms for selecting the particular participant manager 130 for which delivery statistics are desired. According to one embodiment of the present invention, the user may expand GUI tree structure 515 by "clicking on" structure indicators 520, 525. As discussed above, the GUI aspect of the present invention operates in a familiar manner to the "directory structure" of a typical "file manager." In doing so, director client 420 requests more specific information with respect to each lower level participant manager 130 appearing in the expanded GUI tree structure 515. As GUI tree structure 515 is expanded further and further, delivery statistics are requested for each corresponding lower level participant manager 130 until GUI tree structure 515 is fully expanded at which time delivery statistics are requested for individual participants 120.

According to one embodiment of the present invention, alone or preferably in combination with the embodiment just described, the user may also select a particular participant manager 130 or participant 120 within GUI tree structure 515 to obtain delivery statistics for that particular entity as described above.

Advertising Model

In one embodiment of the present invention, participants 120 acquire ticket 240 at least in part, by providing demographic information to ticket provider 150. Such demographic information may include, but is not limited to, a name, a geographic location, an address, an age, a gender, a household income, an occupation, a telephone number, an email address, a product preference, and various other demographic or marketing information as would be apparent.

According to the present invention, such demographic information is gathered by ticket providers 150 and collected at director server 410 and preferably organized using an identification of ticket 240 that was issued in exchange for the demographic information. This demographic information may be used to provide targeted advertising to participants 120 that correspond to a particular demographic profile. Such a demographic profile may be generated at director client 420 and forwarded to director server 410 to obtain a list of participants 120 that match the demographic profile for a particular event 220 or group of events 220 so that a particular advertisement may be sent to the list of participants 120.

In a preferred embodiment, one or more URL addresses are included with ticket 240 for delivering advertising information to participant 120 during event 220. One URL address may deliver a "stadium banner" that is delivered to all participants of event 220. Another URL address may deliver an advertising stream only to those participants 120 of event 220 that match a particular demographic profile.

For example, a particular advertiser may wish to target an advertisement towards 18-25 year old males living within a particular geographic area (e.g., San Francisco) during a particular event or type of event. The advertiser would access the present invention through director client 420 to create an appropriate demographic profile corresponding to this group of individuals and forward it to director server 410. Director server 410 subsequently includes a URL address corresponding to the advertisement in tickets 240 for the particular event 220 or type of event provided to participants 120 that the match the advertiser's demographic profile.

While the present invention has been described in terms of a preferred embodiment, other embodiments and variations are within the scope of the following claims.

What is claimed is:

1. A system for managing a plurality of participants to an event comprising:
   a plurality of participant manager devices installed within a network communication system and logically connected in a hierarchy amongst themselves and between a director device and a plurality of participant devices, wherein each of the participant manager devices is assigned a level within the hierarchy, and wherein each of the participant manager devices is configured to automatically determine its position within the hierarchy when entering the hierarchy by performing the following:
   transmitting an announce message to other participant manager devices in the hierarchy;
   identifying a current upstream participant manager device as being one level higher than the entering participant manager computing device;
   iteratively comparing hierarchy levels of participant manager devices responding to the announce message to identify responding participant manager devices having a hierarchy level between the current upstream participant manager device and the entering participant manager device; and
   in response to identifying a responding participant manager device having a hierarchy level between the current upstream participant manager device and the entering participant manager device, transmitting an attach message to the responding participant manager device having a hierarchy level between the current upstream participant manager device and the entering participant manager device.

2. The system of claim 1, further comprising a participant device, wherein the participant device is configured to send delivery statistics regarding an associated participant to a connected participant manager device; and
   wherein said plurality of participant manager devices propagates said delivery statistics upstream through said hierarchy to said director device.

3. The system of claim 2, wherein each of said plurality of participant manager devices is configured to aggregate delivery statistics from participants beneath it in said hierarchy.

4. The system of claim 1, further comprising a participant device, wherein the participant device is configured to:
   receive an electronic ticket from a participant;
   perform a first authentication on the ticket; and
   if the ticket passes the first authentication, forward the ticket to a corresponding participant manager device for authentication.

5. The system of claim 4, wherein said connected participant manager device is configured to communicate authorization to the participant device that forwarded the ticket, upon determining said ticket is authentic.

6. The system of claim 1, further comprising a participant device configured to prevent an associated participant from receiving an event until a ticket associated with the event is determined to have been provided to said associated participant.

7. The system of claim 1, wherein a ticket associated with an event includes first authentication information and second authentication information, wherein the first authentication information is used by the turnstile to locally determine whether the ticket is a valid ticket, and the second authentication information is used by the connected participant manager to determine whether the valid ticket is authentic.

8. The system of claim 1, further comprising a director device, wherein the director device is a server configured to allocate a fixed number of tickets to an event.

9. The system of claim 8, wherein the director server is configured to allocate the fixed number of tickets among the plurality of participant manager devices.

10. The system of claim 1, further comprising a director device, wherein the director device is a server configured to allocate a fixed number of tickets to content providers.

11. The system of claim 1, wherein the participant manager devices are further configured to:
    in response to identifying a responding participant manager device having a same hierarchy level as the current upstream participant manager device, determining whether to update the identified current upstream participant manager device by comparing a distance between the entering participant manager device and responding participant manager device having the same hierarchy level as the current upstream participant manager device, with a distance between the current upstream participant manager device and the entering participant manager device.

12. The system of claim 11, wherein the distances between devices are based on a number of hops needed for communications between the devices.

13. A method of adding a new device to a device hierarchy, comprising:
    adding a new participant manager device to a communication network having a plurality of participant manager devices arranged in a hierarchy, wherein the new participant manager device is assigned a level in the hierarchy;
    transmitting, from the new participant manager device, an announcement message to the plurality of participant manager devices;
    iteratively comparing, for responses received at the new participant manager device from responding participant manager devices, a hierarchy level of the responding device with a hierarchy level of a current next-step-upstream participant manager device; and
    in response to determining that the responding device has a level in between the level of the current next-step-upstream device and the new participant manager device, transmitting an attachment message from the new participant manager device to the responding device, and storing information identifying the responding device as the new current next-step-upstream participant manager device.

14. The method of claim 13, further comprising:
    the new participant manager device being managed by the current next-step-upstream participant manager device.

15. The method of claim 13, further comprising:
in response to determining that a responding device has a level equal to a level of the current next-step-upstream device, using a distance comparison to determine which of the two equal-level devices should be the managing device for the new participant manager device.

16. The method of claim 15, wherein the distance comparison further comprises determining which of the devices being compared is closest to the new participant manager device within a communication network.

17. The method of claim 16, wherein the distance is based on a number of hops needed for two devices to communicate with one another within the communication network.

* * * * *

UNITED STATES PATENT AND TRADEMARK OFFICE
CERTIFICATE OF CORRECTION

| | | |
|---|---|---|
| PATENT NO. | : 7,680,912 B1 | Page 1 of 1 |
| APPLICATION NO. | : 09/915287 | |
| DATED | : March 16, 2010 | |
| INVENTOR(S) | : James McNabb et al. | |

It is certified that error appears in the above-identified patent and that said Letters Patent is hereby corrected as shown below:

On the Title Page, Item (63), below "Filed: Jul. 27, 2001":

Please insert Item --(63) Related U.S. Application Data
Continuation of application No. 09/572,853, filed May 18, 2000--

Signed and Sealed this

Eighteenth Day of May, 2010

David J. Kappos
*Director of the United States Patent and Trademark Office*